US008859668B2

(12) United States Patent
Morishita et al.

(10) Patent No.: US 8,859,668 B2
(45) Date of Patent: Oct. 14, 2014

(54) RESIN COMPOSITION

(75) Inventors: Takuya Morishita, Nagoya (JP);
Mitsumasa Matsushita, Nagoya (JP);
Yoshihide Katagiri, Nisshin (JP); Kenzo Fukumori, Nisshin (JP); Minoru Takahara, Aichi-gun (JP); Takashi Ohta, Nagoya (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 794 days.

(21) Appl. No.: 13/060,523

(22) PCT Filed: Sep. 18, 2009

(86) PCT No.: PCT/JP2009/066860
§ 371 (c)(1),
(2), (4) Date: Feb. 24, 2011

(87) PCT Pub. No.: WO2010/035851
PCT Pub. Date: Apr. 1, 2010

(65) Prior Publication Data
US 2011/0152435 A1 Jun. 23, 2011

(30) Foreign Application Priority Data

Sep. 24, 2008 (JP) ................................ 2008-244598

(51) Int. Cl.
*B60C 1/00* (2006.01)
*C08L 81/00* (2006.01)
(Continued)

(52) U.S. Cl.
CPC ................ *C08L 77/00* (2013.01); *C08L 51/06* (2013.01); *C08L 23/12* (2013.01); *C08K 2201/011* (2013.01); *C08L 81/00* (2013.01);
*C08L 23/06* (2013.01); *C08L 35/00* (2013.01); *B82Y 30/00* (2013.01); *C08L 33/12* (2013.01); *C08L 23/26* (2013.01); *C08K 3/04* (2013.01); *C08L 2205/02* (2013.01)
USPC ........................................................ 524/495

(58) Field of Classification Search
USPC ........................................................ 524/495
See application file for complete search history.

(56) References Cited

U.S. PATENT DOCUMENTS

2005/0176869 A1 8/2005 Lee et al.

FOREIGN PATENT DOCUMENTS

JP A 2005-054094 3/2005
JP A 2005-150362 6/2005
(Continued)

OTHER PUBLICATIONS

Aug. 15, 2012 Office Action issued in Japanese Patent Application No. 2009-217643 (with translation).
(Continued)

*Primary Examiner* — Ling Choi
*Assistant Examiner* — Thuy-Ai Nguyen
(74) *Attorney, Agent, or Firm* — Oliff PLC

(57) ABSTRACT

A resin composition comprises a carbon-based nanofiller (A), a modified polyolefin-based polymer (B), and two or more resins (C) other than the modified polyolefin-based polymer (B), the resin composition comprising a dispersed phase formed from a resin ($C_{aff}$) which has a highest affinity for the carbon-based nanofiller (A) among the two or more resins (C), and a continuous phase formed from the remaining one or more resins (C1), wherein at least part of the modified polyolefin-based polymer (B) is present at an interface between the dispersed phase and the continuous phase, and the carbon-based nanofiller (A) is present in the dispersed phase.

4 Claims, 6 Drawing Sheets

(51) Int. Cl.
  *C08L 77/00* (2006.01)
  *B82Y 30/00* (2011.01)
  *C08L 33/12* (2006.01)
  *C08L 23/26* (2006.01)
  *C08L 51/06* (2006.01)
  *C08L 23/12* (2006.01)
  *C08L 23/06* (2006.01)
  *C08L 35/00* (2006.01)
  *C08K 3/04* (2006.01)

(56) References Cited

FOREIGN PATENT DOCUMENTS

| JP | A-2005-248076 | | 9/2005 |
| JP | 2006-083195 | * | 3/2006 |
| JP | A-2006-083195 | | 3/2006 |

OTHER PUBLICATIONS

Zhang et al., "Morphology and Electrical Properties of Short Carbon Fiber-Filled Polymer Blends: High-Density Polyethylene/Poly (methyl methacrylate)," Journal of Applied Polymer Science, vol. 69, 1998, pp. 1813-1819.

Li et al., "Conductive PVDF/PA6/CNTs Nanocomposites Fabricated by Dual Formation of Cocontinuous and Nanodispersion Structures," Macromolecules, vol. 41, 2008, pp. 5339-5344.

International Search Report issued in PCT/JP2009/066860, mailed Dec. 15, 2009.

Written Opinion issued in PCT/JP2009/066860, mailed Dec. 15, 2009.

Feb. 26, 2013 Office Action issued in Chinese Patent Application No. 200980136186.0 (with translation).

* cited by examiner

500nm

50nm

RESIN COMPOSITION

TECHNICAL FIELD

The present invention relates to a resin composition comprising a carbon-based nanofiller.

BACKGROUND ART

Carbon-based nanofillers represented by carbon nanotube (CNT) are excellent in thermal conductive properties, electrical conductive properties, mechanical properties and the like. Accordingly, addition of such a nanofiller to a resin have been examined to provide the resin with these properties or to improve these properties of the resin. Among such resin properties which are improved by the addition of such a carbon-based nanofiller, electrical conductive properties can be improved relatively easily; however, it is not easy to significantly improve thermal conductive properties.

In this connection, as a resin composition with improved thermal conductive properties, Japanese Unexamined Patent Application Publication No. 2005-54094 (PTL 1) proposes a thermally conductive resin material obtained by dispersing carbon such as fibrous carbon in a mixture of two or more resins. In this resin material, the carbon is dispersed selectively only in one resin phase. Thereby, a thermally conductive path is formed of the carbon, to improve the thermal conductive properties. Such a thermally conductive path also acts as an electrically conductive path, thereby enhancing the electrical conductive properties as well. For this reason, this resin material is not applicable to applications where both thermal conductive properties and insulating properties are required.

Japanese Unexamined Patent Application Publication No. 2005-150362 (PTL 2) discloses a highly thermally conductive sheet in which a thermally conductive filler such as carbon nanotube is dispersed in a commodity resin, and also discloses that an electrically insulating material such as alumina is dispersed in the commodity resin to reduce the electrical conductive properties of the sheet and to prevent an electrical short. However, even when an electrically insulating material such as alumina is dispersed, high insulating properties tend not to be achieved. Moreover, when a large amount of electrically insulating material is blended in the commodity resin for the purpose of improving the insulating properties of the sheet, the sheet tends to have a high relative density because the electrically insulating material has a high relative density, and to also have poor formability.

Meanwhile, in the application fields such as various parts for vehicles and various parts for electrical and electronic equipments, particularly in the application fields of various parts made of resin for automobiles, lighter and higher-functional materials are demanded from the viewpoints of reducing carbon dioxide emission and of saving energy. In this connection, there is a demand for resin materials which have both thermal conductive properties and insulating properties as well as a relative density in which an increase is restrained.

CITATION LIST

Patent Literature

[PTL 1] Japanese Unexamined Patent Application Publication No. 2005-54094
[PTL 2] Japanese Unexamined Patent Application Publication No. 2005-150362

SUMMARY OF INVENTION

Technical Problem

The present invention has been made in view of the above-described problems of the conventional techniques, and an object of the present invention is to provide a resin composition which has high levels of both thermal conductive properties and insulating properties as well as a relative density in which an increase is restrained, and which is less likely to exhibit anisotropy of thermal conductivity, even when subjected to processing under shear such as injection molding.

Solution to Problem

The present inventors have earnestly studied in order to achieve the above object. As a result, the present inventors revealed that, by adding a modified polyolefin-based polymer into a resin composition comprising a carbon-based nanofiller and two or more resins, a phase structure as shown in FIG. 1 is formed (in this figure, only major components are shown in each phase, and components in each of the phases in the resin composition of the present invention is not limited thereto). This phase structure is formed of a dispersed phase containing the carbon-based nanofiller and a continuous phase. Moreover, the present inventors revealed that such a phase structure is capable of preventing an electrical short, and that the resin composition has high levels of both thermal conductive properties and insulating properties as well as a relative density in which an increase is restrained, and is less likely to exhibit anisotropy of thermal conductivity, even when subjected to processing under shear. These findings have led the inventors to complete the present invention.

Specifically, the resin composition of the present invention comprises a carbon-based nanofiller (A), a modified polyolefin-based polymer (B), and two or more resins (C) other than the modified polyolefin-based polymer (B), the resin composition comprising a dispersed phase formed from a resin ($C_{aff}$) which has a highest affinity for the carbon-based nanofiller (A) among the two or more resins (C), and a continuous phase formed from the remaining one or more resins (C1), wherein at least part of the modified polyolefin-based polymer (B) is present at an interface between the dispersed phase and the continuous phase, and the carbon-based nanofiller (A) is present in the dispersed phase.

In the resin composition of the present invention, Y/X is preferably 1.5 or more, where X (unit: % by volume) represents a ratio of the dispersed phase to the whole resin composition, and Y (unit: % by volume) represents a ratio of a carbon-based nanofiller ($A_{dsp}$) contained in the dispersed phase to all the carbon-based nanofiller (A).

In addition, in the resin composition of the present invention, at least part of the modified polyolefin-based polymer (B) is preferably reacted with any one or both of the resin ($C_{aff}$) and the resin (C1). Moreover, the resin (C1) preferably comprises a crystalline resin.

Such a resin composition tends to have a thermal conductivity of 0.3 W/mK or more and a volume resistivity of $10^{13}$ Ω·cm or more.

Here, it is not known exactly why the phase structure formed of a dispersed phase 3 containing the carbon-based nanofiller (A) 1 and a continuous phase 4 as shown in FIG. 1 is formed by adding the modified polyolefin-based polymer (B) into a resin composition comprising the carbon-based nanofiller (A) and the two or more resins (C). However, the present inventors speculate as follows. Specifically, although having a lower affinity for the carbon-based nanofiller (A)

than a resin forming the dispersed phase 3, the modified polyolefin-based polymer (B) has a high affinity for and/or a high reactivity with resins forming the dispersed phase 3 and the continuous phase 4. Hence, the modified polyolefin-based polymer (B) is present at an interface between the dispersed phase 3 and the continuous phase 4, and plays a role like a shell of the dispersed phase 3. At this time, when the dispersed phase 3 is formed of the resin ($C_{aff}$) which has a high affinity for the carbon-based nanofiller (A) among the two or more resins (C), the carbon-based nanofiller (A) is more likely to be encompassed by the high affinity resin ($C_{aff}$), and localized in the dispersed phase 3. Further, the carbon-based nanofiller (A) is confined by the modified polyolefin-based polymer (B) 2 in the dispersed phase 3.

Moreover, it is not known exactly why the resin composition of the present invention has high levels of both thermal conductive properties and insulating properties as a result of the formation of the phase structure as shown in FIG. 1. However, the present inventors speculate as follows. Specifically, in the resin composition of the present invention, the dispersed phase 3 is encompassed by the modified polyolefin-based polymer (B) 2. Hence, the carbon-based nanofiller ($A_{dsp}$) 1 in the dispersed phase 3 is less likely to be in contact with the carbon-based nanofiller (A) in another pieces of the dispersed phase or in the continuous phase 4, and thereby is less likely to form an electrically conductive path. In addition, the modified polyolefin-based polymer (B) 2 also plays a role of blocking electrical conduction at the interface between the dispersed phase 3 and the continuous phase 4. Accordingly, the present inventors speculate that, as a result thereof, the resin composition of the present invention exhibits high insulating properties. Furthermore, the present inventors speculate that, since the modified polyolefin-based polymer (B) 2 plays a role of reducing the thermal resistance at the interface, the thermal conductive properties of the resin composition are improved. In contrast, in each conventional resin composition, a carbon-based nanofiller (A) 1 is dispersed in a resin 4 as shown in FIG. 4. Accordingly, the thermal resistance at an interface between the carbon-based nanofiller (A) and the resin 4 is relatively high, and thereby the thermal conductive properties are not sufficiently improved. Moreover, pieces of the carbon-based nanofiller (A) 1 are in contact with each other to form an electrically conductive path, and thereby the insulating properties are reduced.

Furthermore, it is not known exactly why the resin composition of the present invention is less likely to exhibit anisotropy of thermal conductivity, even when subjected to processing under shear. However, the present inventors speculate as follows. Specifically, in the resin composition of the present invention, the carbon-based nanofiller (A) is localized in the dispersed phase 3 to form aggregates, and the modified polyolefin-based polymer (B) 2 is present at the interface between the dispersed phase 3 and the continuous phase 4. As a result, it is possible to make the carbon-based nanofiller (A) less orientated in processing under shear such as injection molding, and to lower anisotropy of various properties such as thermal conductive properties, due to the orientation of carbon-based nanofiller (A).

Advantageous Effect of Invention

According to the present invention, it is possible to obtain a resin composition which has high levels of both thermal conductive properties and insulating properties as well as a relative density in which an increase is restrained, and which is less likely to exhibit anisotropy of thermal conductivity, even when subjected to processing under shear.

DESCRIPTION OF EMBODIMENTS

Figure 1:
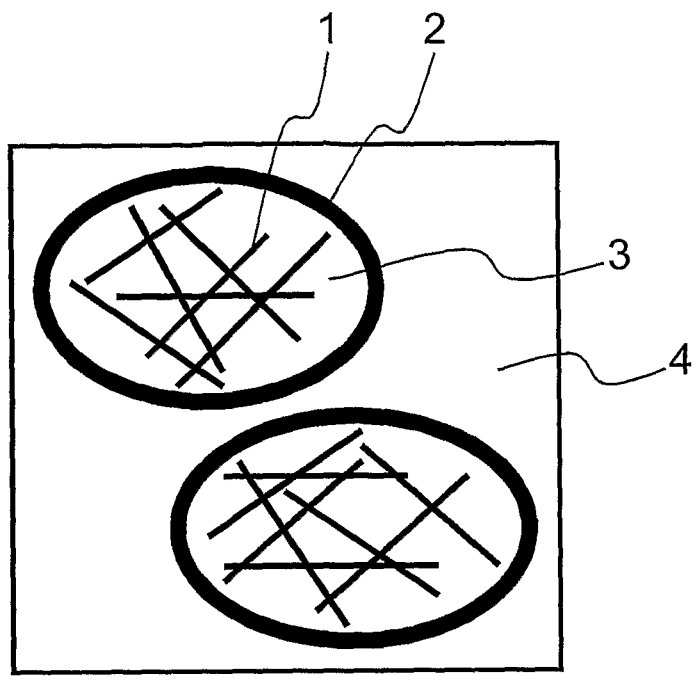
FIG. 1 is a schematic diagram showing a state of the resin composition of the present invention comprising a carbon-based nanofiller.

Hereinafter, the present invention will be described in details on the basis of preferred embodiments thereof. A resin composition of the present invention comprises a carbon-based nanofiller (A), a modified polyolefin-based polymer (B), and two or more resins (C) other than the modified polyolefin-based polymer (B). In this resin composition, a resin ($C_{aff}$) which has a highest affinity for the carbon-based nanofiller (A) among the two or more resins (C), forms a dispersed phase, and the remaining one or more resins (C1) forms a continuous phase. Moreover, at least part of the modified polyolefin-based polymer (B) is present at an interface between the dispersed phase and the continuous phase, and the carbon-based nanofiller (A) is present in the dispersed phase.

First, the carbon-based nanofiller (A), the modified polyolefin-based polymer (B), and the two or more resins (C) other than the modified polyolefin-based polymer (B) used in the present invention will be described.

(A) Carbon-Based Nanofiller

The carbon-based nanofiller (A) used in the present invention is not particularly limited, and examples thereof include carbon nanofiber, carbon nanohorn, carbon nanocone, carbon nanotube, carbon nanocoil, carbon microcoil, carbon nanotwist, carbon nanobaloon, carbon nanosheet, carbon nanowall, fullerene, graphite, carbon flake, derivatives thereof, and the like. These carbon-based nanofillers may be used alone or in combination of two or more kinds. From the viewpoints of improvement in thermal conductive properties and mechanical strength achieved by using such a carbon-based nanofiller, anisotropic carbon-based nanofillers such as carbon nanofiber, carbon nanohorn, carbon nanocone, carbon nanotube, carbon nanocoil, carbon microcoil, carbon nanotwist, carbon nanobaloon, carbon nanosheet, and carbon nanowall are preferable, and carbon nanofiber and carbon nanotube are more preferable.

When a carbon nanotube and/or a carbon nanofiber are used as the carbon-based nanofiller (A) in the present invention, any of single-walled ones and multi-walled (double-walled or more) ones can be used. In accordance with the application, any of these carbon nanotubes and carbon nanofibers can be suitably selected for use, or can be used in combination.

Such a carbon-based nanofiller (A) may have a shape like a single trunk or a dendritic shape in which many pieces of the carbon-based nanofiller have outwardly grown like a branch. From the viewpoints of thermal conductive properties, mechanical strength, and the like, the shape is preferably like a single trunk. In addition, the carbon-based nanofiller (A) may contain an atom other than carbon or may contain a molecule. The carbon-based nanofiller (A) may encapsulate metals or other nanostructures, if necessary.

The average diameter of such a carbon-based nanofiller (A) is not particularly limited, but is preferably 1000 nm or less, more preferably 500 nm or less, further preferably 300 nm or less, particularly preferably 200 nm or less, and most preferably 100 nm or less. If the average diameter of the carbon-based nanofiller (A) exceeds the above upper limit, there are tendencies that addition of small amount of the carbon-based nanofiller (A) to a resin insufficiently improves the thermal conductive properties, and that, by the addition of small amount thereof, mechanical strengths such as tensile strength are insufficiently exhibited. Note that, the lower limit value of the average diameter of the carbon-based nanofiller (A) is not particularly limited, but is preferably 0.4 nm, and more preferably 0.5 nm.

Meanwhile, the aspect ratio of the carbon-based nanofiller (A) is not particularly limited, but is preferably 5 or more, more preferably 10 or more, further preferably 20 or more, particularly preferably 40 or more, and most preferably 80 or more, from the viewpoint that, by addition of small amount of the carbon-based nanofiller (A) to the resin, mechanical strengths such as tensile strength, flexural modulus and impact strength are improved, and linear thermal expansion is reduced, and further from the viewpoint that addition of small amount thereof improves the thermal conductive properties of the carbon-based nanofiller (A) and the resin composition comprising the same in applications where thermal conductive properties are required.

In the present invention, the ratio (G/D) of a G band to a D band is not particularly limited. Here, among peaks in a raman spectrum obtained by measuring the carbon-based nanofiller (A) by using a raman spectrometry, the G band is observed at around 1585 $cm^{-1}$ and attributed to tangential vibration of carbon atoms in a graphene structure, and the D band is observed at around 1350 $cm^{-1}$ in a case where a defect such as a dangling bond is present in the graphene structure. In applications, such as highly thermally conductive resin materials, where a high thermal conductive properties are required, however, the ratio (G/D) is preferably 0.1 or more, more preferably 1.0 or more, further preferably 3.0 or more, particularly preferably 5.0 or more, and most preferably 10.0 or more. If the G/D is less than the lower limit, thermal conductive properties tend to be insufficiently improved.

Such a carbon-based nanofiller (A) can be produced by appropriately selecting a production method from conventionally-known methods including chemical vapor deposition methods (CVD methods) such as a laser ablation method, an arc synthesis method and a HiPco process; a melt-spinning method; and the like; in accordance with the application. However, the carbon-based nanofiller (A) used in the present invention is not limited to those produced in accordance with these methods.

In the resin composition of the present invention, the lower limit of content of the carbon-based nanofiller (A) is not particularly limited, but is preferably 0.1% by volume or more, more preferably 0.3% by volume or more, further preferably 0.5% by volume or more, particularly preferably 0.7% by volume or more, and most preferably 1.0% by volume or more, relative to the total volume of the resin composition. If the content of the carbon-based nanofiller (A) is less than the lower limit, the thermal conductive properties and the mechanical strength tend to decrease. On the other hand, the upper limit of content of the carbon-based nanofiller (A) is not particularly limited, as long as insulating properties are retained; however, the content is preferably 50% by volume or less, more preferably 40% by volume or less, further preferably 30% by volume or less, particularly preferably 20% by volume or less, and most preferably 10% by volume or less, relative to the total volume of the resin composition. If the content of the carbon-based nanofiller (A) exceeds the above upper limit, the formability of the resin composition tends to be lowered.

Moreover, in the resin composition of the present invention, such a carbon-based nanofiller (A) is present locally in the dispersed phase in general; however, part of the carbon-based nanofiller (A) may be present in the continuous phase.

(B) Modified Polyolefin-Based Polymer

At least part of the modified polyolefin-based polymer (B) used in the present invention is present at an interface between the dispersed phase and the continuous phase. For this reason, the modified polyolefin-based polymer (B) preferably has a low affinity for the carbon-based nanofiller (A) and a high affinity for and/or reactivity with the two or more resins (C). In particular, when the modified polyolefin-based polymer (B) has a low affinity for the carbon-based nanofiller (A), the carbon-based nanofiller (A) is more likely to be confined in the dispersed phase. The presence of the modified polyolefin-based polymer (B) at the interface tends to reduce the thermal resistance at the interface, and thereby the thermal conductivity of the resin composition tends to be improved. Further, the presence thereof tends to improve the insulating property of the interface. Moreover, the formation of the interface prevents pieces of the dispersed phase from becoming a continuous phase, the continuous phase being formed by stretching the dispersed phase in a processing under shear such as injection molding. Thereby, the carbon-based nanofiller (A) is less oriented in a flow direction. As a result, various properties such as thermal conductive properties tend to be less anisotropic.

Examples of the modified polyolefin-based polymer (B) include modified polyolefin-based polymers each having at least one functional group selected from the group consisting of an epoxy group, a carboxyl group, an acid anhydride group, an amino group, an amide group, an oxazoline group, a hydroxyl group, a mercapto group, a ureido group and an isocyanate group. In addition, as the modified polyolefin-based polymer (B), a copolymer of an olefin-based monomer with a different vinyl-based monomer from the olefin-based monomer and from a vinyl-based monomer having the aforementioned functional group (hereinafter referred to as a "different vinyl-based monomer") and a hydrogenated copolymer thereof, as well as a copolymer obtained by adding the aforementioned functional group to one of these copolymers can be used. The structures of these copolymers are not particularly limited, and examples thereof include a random copolymer, a block copolymer, and a graft copolymer. Of these, a block copolymer and a graft copolymer are more preferable. Preferable and specific examples of such a copolymer include styrene-butadiene-styrene block copolymers, styrene-ethylene-butadiene-styrene block copolymers, hydrogenated block copolymers thereof, and the like. These modified polyolefin-based polymers (B) may be used alone or in combination of two or more kinds.

Of these modified polyolefin-based polymers (B), a modified polyolefin-based polymer having at least one functional group selected from the group consisting of an epoxy group, a carboxyl group, an acid anhydride group, an amino group, an amide group, an oxazoline group, a hydroxyl group, a mercapto group, a ureido group and an isocyanate group is preferable, from the viewpoint that a larger proportion of the carbon-based nanofiller (A) is localized and encapsulated in the dispersed phase. Moreover, when at least one of the two or more resins (C) is a resin having a reactive functional group to be described later, the functional group in such a modified polyolefin-based polymer (B) can be reacted with the aforementioned reactive functional group in situ by heating in a process such a melt kneading. This results in the formation of a graft polymer or a block polymer (preferably a graft polymer) at the interface. Thereby, the thermal conductive properties and the insulating properties can be improved, and the thermal conductivity can be less anisotropic. Note that, in the present invention, when the modified polyolefin-based polymer (B) is reacted with the resin (C) (namely, the resin ($C_{aff}$) which has the highest affinity and which will be described later, and/or the different resins (C1)), the reaction product is included within the modified polyolefin-based polymer (B) according to the present invention.

From the viewpoint that the affinity for and/or the reactivity with at least one of the two or more resins (C) is improved and the thermal resistance at the interface is reduced, an epoxy group, a carboxyl group, an acid anhydride group, an amino group and an isocyanate group are preferable, an epoxy group, a carboxyl group and an acid anhydride group are more preferable, and an epoxy group is particularly preferable, as the functional group in the modified polyolefin-based polymer (B).

Examples of methods for producing the modified polyolefin-based polymer having such a functional group include a method of copolymerizing an olefin-based monomer with a vinyl-based monomer having the functional group (hereinafter referred to as a "functional group-containing vinyl-based monomer"), and, if necessary, a different vinyl-based monomer from these monomers; a method of graft-polymerizing the functional group-containing vinyl-based monomer onto an unmodified polyolefin-based polymer, if necessary, in the presence of a polymerization initiator such as a radical polymerization initiator; a method of polymerizing an olefin-based monomer and, if necessary, the different vinyl-based monomer, in the presence of a polymerization initiator or chain transfer agent having the functional group; and the like. The polymerization method for these polymers is not particularly limited, and conventionally-known methods can be suitably employed. In addition, the structure of the obtained copolymer is not particularly limited, and examples thereof include a random structure, a block structure, and a graft structure. Moreover, in the present invention, a commercially-available modified polyolefin-based polymer having the functional group can also be used.

Examples of the olefin-based monomer used for the modified polyolefin-based polymer (B) include monoolefinic monomers such as ethylene, propylene, 1-butene, cis-2-butene, trans-2-butene, isobutene, 1-pentene, 2-pentene, 2-methyl-1-butene, 3-methyl-1-butene, 2,3-dimethyl-2-butene, 1-butene, 1-hexene, 1-octene, 1-nonene and 1-decene; dienic monomers such as allene, methylallene, butadiene, 2,3-dimethylbutadiene, 1,3-pentadiene, 1,4-pentadiene, chloroprene, and 1,5-hexadiene; and the like. These olefin-based monomers may be used alone or in combination of two or more kinds. Of these olefin-based monomers, a single or mixture monomer comprising at least ethylene is preferably used, and ethylene is more preferably used, from the viewpoint that the thermal resistance at the interface between the dispersed phase and the continuous phase is reduced and thereby thermal conductive properties are improved.

Examples of the functional group-containing vinyl-based monomer include unsaturated carboxylic acids such as (meth)acrylic acid, and metal salts thereof; unsaturated dicarboxylic acids such as maleic acid, fumaric acid, itaconic acid, crotonic acid, methylmaleic acid (citraconic acid), methylfumaric acid (mesaconic acid), glutaconic acid, tetrahydrophthalic acid, endo bicyclo-(2,2,1)-5-heptene-2,3-dicarboxylic acid, methyl-1,2,3,6-tetrahydrophthalic acid, 5-norbornene-2,3-dicarboxylic acid, and methyl-5-norbornene-2,3-dicarboxylic acid, and metal salts thereof; mono alkyl esters of the above unsaturated dicarboxylic acids, such as monomethyl maleate and monoethyl maleate, and metal salts thereof; amino group-containing vinyl-based monomers such as aminoethyl(meth)acrylate, propylaminoethyl(meth)acrylate, 2-dimethylaminoethyl (meth)acrylate, 2-diethylaminoethyl(meth)acrylate, ethylaminopropyl(meth)acrylate, 2-dibutylaminoethyl (meth)acrylate, 3-dimethylaminopropyl(meth)acrylate, 3-diethylaminopropyl(meth)acrylate, phenylaminoethyl (meth)acrylate, cyclohexylaminoethyl(meth)acrylate, p-aminostyrene, N-vinyldiethylamine, N-acetylvinylamine, allylamine, methallylamine, and N,N-dimethylallylamine; unsaturated carboxylic anhydrides such as maleic anhydride, fumaric anhydride, itaconic anhydride, crotonic anhydride, methylmaleic anhydride, methylfumaric anhydride, mesaconic anhydride, citraconic anhydride, glutaconic anhydride, tetrahydrophthalic anhydride, endo bicyclo-(2,2,1)-5-heptene-2,3-dicarboxylic anhydride, methyl-1,2,3,6-tetrahydrophthalic anhydride, 5-norbornene-2,3-dicarboxylic anhydride, and methyl-5-norbornene-2,3-dicarboxylic anhydride; epoxy group-containing vinyl-based monomers such as glycidyl(meth)acrylate, glycidyl ethacrylate, glycidyl maleate, glycidyl fumarate, glycidyl itaconate, glycidyl crotonate, glycidyl citraconate, glycidyl glutaconate, p-glycidylstyrene, allyl glycidyl ether, and styrene-p-glycidyl ether; oxazoline group-containing vinyl-based monomers such as 2-isopropenyl-oxazoline, 2-vinyl-oxazoline, 5-methyl-2-vinyl-oxazoline, 2-acroyl-oxazoline, 2-styryl-oxazoline, 4,4-dimethyl-2-vinyl-oxazoline, and 4,4-dimethyl-2-isopropenyl-oxazoline; amide group-containing vinyl-based monomers such as (meth)acrylamide, N-methylacrylamide, butoxymethylacrylamide, and N-propyl methacrylamide; hydroxyl group-containing vinyl-based monomers such as 2-hydroxyethyl(meth)acrylate, 3-hydroxypropyl(meth)acrylate, 2,3,4,5,6-pentahydroxyhexyl (meth)acrylate, 2,3,4,5-tetrahydroxypentyl(meth)acrylate, 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene, and 4-dihydroxy-2-butene; and the like. These functional group-containing vinyl-based monomers may be used alone or in combination of two or more kinds. Of these functional group-containing vinyl-based monomers, unsaturated carboxylic anhydrides and epoxy group-containing vinyl-based monomers are more preferable, and epoxy group-containing vinyl-based monomers are particularly preferable, from the viewpoints of the improvement in affinity for and/or reactivity with at least one of the two or more resins (C) and of reduction in thermal resistance at the interface.

The different vinyl-based monomer used for the modified polyolefin-based polymer (B) according to the present invention is not particularly limited, and examples thereof include aromatic vinyl-based monomer such as styrene, α-methylstyrene, o-methylstyrene, p-methylstyrene, m-methylstyrene, o-ethylstyrene, p-t-butylstyrene, chlorostyrene, chloromethylstyrene, and bromostyrene, (meth)acrylonitrile, methyl (meth)acrylate, ethyl (meth)acrylate, propyl(meth)acrylate, butyl(meth)acrylate, allyl(meth)acrylate, N-phenylmaleimide, N-methylmaleimide, butyl acetate, vinyl acetate, isopropenyl acetate, vinyl chloride, and the like. These different vinyl-based monomers may be used alone or in combination of two or more kinds.

In the modified polyolefin-based polymer (B), the content percentage of the functional group-containing vinyl-based monomer unit is preferably 0.01% by mass or more, more preferably 0.1% by mass or more, further preferably 0.5% by mass or more, particularly preferably 1% by mass or more, and most preferably 8% by mass or more, relative to all constitutional units in the modified polyolefin-based polymer (B). On the other hand, the content percentage is preferably 99% by mass or less, more preferably 80% by mass or less, further preferably 70% by mass or less, particularly preferably 60% by mass or less, and most preferably 50% by mass or less. If the content percentage of the functional group-containing vinyl-based monomer unit is less than the lower limit, thermal resistance at the interface between the dispersed phase and the continuous phase tends to be insufficiently reduced, thermal conductive properties and insulating properties tend to be insufficiently improved, and anisotropy of thermal conductivity tends to be insufficiently suppressed. On the other hand, if the content percentage exceeds the above upper limit, the formability of the resin composition tends to be lowered.

In the resin composition of the present invention, the content of the modified polyolefin-based polymer (B) is not particularly limited, but is preferably 0.01 times or more, more preferably 0.05 times or more, further preferably 0.1 times or more, particularly preferably 0.15 times or more, and most preferably 0.2 times or more of the volume of the resin ($C_{aff}$) which has the highest affinity for the carbon-based nanofiller (A) and which is to be described later. On the other hand, the content of the modified polyolefin-based polymer (B) is preferably 30 times or less, more preferably 20 times or less, and particularly preferably 10 times or less of the volume of the resin ($C_{aff}$). If the content of the modified polyolefin-based polymer (B) is less than the lower limit, anisotropy of thermal conductivity tends to be insufficiently suppressed, and particularly insulating properties tend to be insufficiently retained. On the other hand, if the content exceeds the above upper limit, the formability of the resin composition tends to be lowered.

In order to reinforce interface strength between the dispersed phase and the continuous phase, besides the modified polyolefin-based polymer (B), bisphenol A, bisphenol F, bisphenol S, epoxy group-containing organic silane, isocyanate group-containing organic silane, resorcinol, hydroquinone, pyrocatechol, diphenyldimethylmethane, 4,4'-dihydroxybiphenyl, 1,3,5-trihydroxybenzene, 1,5-dihydroxynaphthalene, cashew phenol, 2,2,5,5-tetrakis(4-hydroxyphenyl)hexane, salicyl alcohol, a bisphenol A-type epoxy compound such as bisphenol A-diglycidyl ether, a glycidyl ester-based epoxy compound such as glycidyl phthalate, a glycidyl amine-based epoxy compound such as N-glycidylaniline, a novolac-type epoxy resin, a novolac phenol-type epoxy resin, or the like may be added to the resin composition of the present invention. These compounds and resins may be used alone or in combination of two or more kinds.

(C) Resins Other than Modified Polyolefin-Based Polymer (B)

Each resin (C) used in the present invention is not particularly limited, as long as the resin is a resin other than the modified polyolefin-based polymer (B). Examples of the resin (C) include thermosetting resins such as epoxy resins, phenol resins, melamine resins, thermosetting imide resins, thermosetting polyamide-imide, thermosetting silicone resins, urea resins, unsaturated polyester resins, benzoguanamine resins, alkyd resins, and urethane resins; aromatic vinyl-based resins such as polystyrene, ABS (acrylonitrile-butadiene-styrene) resins, AS (acrylonitrile-styrene) resins, methyl methacrylate-acrylonitrile-styrene resins, methyl methacrylate-acrylonitrile-butadiene-styrene resins, styrene-butadiene-styrene block copolymers and styrene-ethylene-butylene-styrene block copolymers; acrylic-based resins such as polymethyl(meth)acrylate, polyethyl(meth)acrylate, polypropyl(meth)acrylate, polybutyl(meth)acrylate, poly(meth)acrylic acid, and copolymers thereof; vinyl cyanide-based resins such as polyacrylonitrile, acrylonitrile-methyl acrylate resins and acrylonitrile-butadiene resins; imide group-containing vinyl-based resins; polyolefin-based resins; acid anhydride-modified acrylic-based elastomers; epoxy-modified acrylic-based elastomers; silicone resins; polycarbonate; polycycloolefins; polyamides; polyesters such as polyethylene terephthalate, polybutylene terephthalate, and poly-1,4-cyclohexanedimethyl terephthalate; polyarylates; liquid crystal polyesters; polyarylene ethers; polyarylene sulfides such as polyphenylene sulfide; polysulfones; polyether sulfones; polyoxymethylene; fluororesins represented by polytetrafluoroethylene, fluorinated ethylene propylene, polychlorotrifluoroethylene, polyvinylidene fluoride and polyvinyl fluoride; thermoplastic resins such as polylactic acid, polyvinyl chloride, thermoplastic polyimides, thermoplastic polyamide-imides, polyether imides, polyether ether ketones, polyether ketone ketones, polyether amides, and the like. In the present invention, two or more, preferably two resins as described above are used as the resins (C). Among these resins, from the viewpoint of the improvement in interface strength due to reaction with the functional group of the modified polyolefin-based polymer (B) present at the interface between the dispersed phase and the continuous phase, as will be described later, resins each having a reactive functional group such as a terminal reactive group are preferable, and polyamides, polyesters, polycarbonates, polyarylene sulfide are more preferable.

In the resin composition of the present invention, part or all of the resin ($C_{aff}$) which has the highest affinity for the carbon-based nanofiller (A), of such two or more resins (C), (hereinafter referred to as a "high affinity resin ($C_{aff}$)") forms the dispersed phase, and part or all of the remaining one or more resins (C1) (hereinafter referred to as "different resins (C1)") forms the continuous phase. Accordingly, in the present invention, the combination of the high affinity resin ($C_{aff}$) and the different resin (C1) is determined depending on the affinities of the two or more resins (C) for the carbon-based nanofiller (A).

Among the resins shown as examples of the two or more resins (C), examples of a resin suitably used as the high affinity resin ($C_{aff}$) include polyolefin-based resins and nitrogen atom-containing resins. Of these, polyolefin-based resins, polyamides and polyimides have higher affinity, polyolefin-based resins and polyamides have further higher affinity, and polyolefin-based resins have particularly high affinity, and polyethylene-based resins have the highest affinity. Accordingly, when a polyolefin-based resin and a polyamide are used as the resins (C), the high affinity resin ($C_{aff}$) is the polyolefin-based resin.

The polyolefin-based resin used in the present invention may be any of a linear one and a branched one. The polyolefin-based resin is not particularly limited, but examples thereof include homopolymers and copolymers of olefin-based monomers such as the monoolefinic monomers and the dienic monomers shown as examples of the modified polyolefin-based polymer (B), and the like. Specific examples of the copolymers of olefin-based monomers include ethylene-based copolymers such as ethylene-propylene copolymers, ethylene-1-butene copolymers, ethylene-4-methyl-1-pentene copolymers, ethylene-1-hexene copolymers, ethylene-propylene-dicyclopentadiene copolymers, ethylene-propylene-5-vinyl-2-norbornene copolymers, ethylene-propylene-1,4-hexadiene copolymers, ethylene-propylene-1,4-cyclohexadiene copolymers and ethylene-1-octene copolymers; propylene-based copolymers such as propylene-1-butene-4-methyl-1-pentene copolymers and propylene-1-butene copolymers; butene-based copolymers such as polybutene, polyisobutene, hydrogenated polyisobutene; polyisoprene, natural rubbers, polybutadiene, chloroprene rubbers, hydrogenated polybutadiene, 1-hexene-4-methyl-1-pentene copolymers and 4-methyl-1-pentene-1-octene copolymers; and the like. In addition, when a polypropylene-based resin is used as the polyolefin-based resin, any of isotactic, atactic, and syndiotactic polypropylene-based resins and the like can be used as this polypropylene-based resin.

Of these polyolefin-based resins, from the viewpoint of having a high affinity for the carbon-based nanofiller (A), polyethylene-based resins (homopolymers and copolymers of ethylene) are preferable, and homopolymers of ethylene and/or ethylene-1-butene copolymers are more preferable. Examples of the homopolymers of ethylene include linear low density polyethylene (LLDPE), low density polyethylene (LDPE), high density polyethylene (HDPE), very low density polyethylene (VLDPE) also called ultra low density polyethylene (ULDPE)), ultra high molecular weight polyethylene (UHMW-PE, generally with a molecular weight of 1.50 million or more), and the like. From the viewpoint of the high thermal conductive properties, HDPE is particularly preferable.

An ethylene-based copolymer such as an ethylene-1-butene copolymer is capable of improving the dispersibility of the carbon-based nanofiller (A) in an organic solvent, when part or all thereof is adsorbed to the surface of the carbon-based nanofiller (A) in the organic solvent such as chloroform. After the part or all of such a copolymer is adsorbed to the surface of the carbon-based nanofiller (A), the solvent is removed by evaporation. The thus prepared composite in which such an ethylene-based copolymer is adsorbed to the carbon-based nanofiller (A) can be used for the resin composition of the present invention. By the adsorption of the high affinity resin ($C_{aff}$) such as an ethylene-1-butene copolymer to the surface of the carbon-based nanofiller (A), for example, the wettability of the interface between the carbon nanofiller (A) and the high affinity resin ($C_{aff}$) tends to be improved in a mixing process during production of the resin composition, and the thermal conductive properties and the insulating properties of the obtained resin composition tend to be improved. Examples of such an ethylene-1-butene copolymer include "TAFMER A0550S" manufactured by Mitsui Chemicals, Inc. and the like.

The specific gravity of the polyolefin-based resin used in the present invention is not particularly limited, but is preferably 0.85 or more, more preferably 0.90 or more, further preferably 0.94 or more, particularly preferably 0.95 or more, and most preferably 0.96 or more. If the specific gravity of the polyolefin-based resin is less than the lower limit, thermal conductivity tends to be insufficiently improved.

The melt flow rate (MFR, determined in accordance with JIS K6922-1) of the polyolefin-based resin is not particularly limited, but is preferably 0.1 g/10 min or more, more preferably 0.2 g/10 min or more, further preferably 3 g/10 min or more, particularly preferably 15 g/10 min or more, and most preferably 30 g/10 min or more, from the viewpoint of insulating property improvement. Moreover, from the viewpoint that the phase structure according to the present invention can be favorably formed, the melt flow rate is preferably 100 g/10 min or less, more preferably 90 g/10 min or less, and further preferably 80 g/10 min or less. If the MFR of the polyolefin-based resin is less than the lower limit, the insulating properties and the fluidity of the resin composition tend to be lowered. On the other hand, if the MFR exceeds the above upper limit, the mechanical properties thereof tend to be lowered.

Examples of the polyamide used in the present invention include homopolymers and copolymers each obtained by using, as major raw materials, a dicarboxylic acid and at least one of an amino acid, a lactam, and a diamine. Such polyamides can be obtained in accordance with publicly-known polycondensation reactions.

Examples of the amino acid include aminocarboxylic acids such as 6-aminocaproic acid, 11-aminoundecanoic acid and 12-aminododecanoic acid. Examples of the lactam include ϵ-caprolactam, ω-laurolactam, and the like. Examples of the diamine include aliphatic, alicyclic and aromatic diamines such as tetramethylenediamine, hexamethylenediamine, ethylenediamine, trimethylenediamine, pentamethylenediamine, 2-methylpentamethylenediamine, nonanediamine, undecamethylenediamine, dodecamethylenediamine, 2,2,4-trimethylhexamethylenediamine, 2,4,4-trimethylhexamethylenediamine, nonamethylenediamine, 5-methylnonamethylenediamine, meta-xylylenediamine, para-xylylenediamine, 1,3-bis(aminomethyl)cyclohexane, 1,4-bis (aminomethyl)cyclohexane, 1-amino-3-aminomethyl-3,5,5-trimethylcyclohexane, bis(4-aminocyclohexyl)methane, bis (3-methyl-4-aminocyclohexyl)methane, 2,2-bis(4-aminocyclohexyl)propane, bis(aminopropyl)piperadine, and aminoethylpiperadine.

Examples of the dicarboxylic acids include aliphatic, alicyclic and aromatic dicarboxylic acids such as adipic acid, suberic acid, azelaic acid, sebacic acid, dodecanedicarboxylic acid, 1,3-cyclohexanedicarboxylic acid, 1,4-cyclohexanedicarboxylic acid, terephthalic acid, isophthalic acid, 2-chloroterephthalic acid, 2-methyl terephthalic acid, 5-methyl isophthalic acid, 5-sodiumsulfoisophthalic acid, hexahydroterephthalic acid, and hexahydroisophthalic acid.

Specific examples of such a polyamide include polycaprolactam (nylon 6), polyhexamethylene adipamide (nylon 66), polytetramethylene adipamide (nylon 46), polyundecanamide (nylon 11), polydodecanamide (nylon 12), polyhexamethylene sebacamide (nylon 610), polyhexamethylene azelamide (nylon 69), polyhexamethylene terephthalamide (nylon 6T), nylon 9T, nylon MXD6, nylon 6/66 copolymer, polycaproamide/polyhexamethylene sebacamide copolymer (nylon 6/610), nylon 6/6T copolymer, nylon 6/66/610 copolymer, nylon 6/12 copolymer, nylon 6T/12 copolymer, nylon 6T/66 copolymer, polycaproamide/polyhexamethylene isophthalamide copolymer (nylon 6/6I), nylon 66/6I/6 copolymer, nylon 6T/6I copolymer, nylon 6T/6I/66 copolymer, nylon 6/66/610/12 copolymer, nylon 6T/M-5T copolymer, and the like. Among those, from the viewpoint that the obtained resin composition has well-balanced chemical resistance, impact resistance and fluidity, nylon 6, nylon 66, nylon 12 and copolymers having these polyamides as their major components are preferable, and nylon 6 and copolymers having nylon 6 as the major component are more preferable.

The molecular weight of the polyamide used in the present invention is not particularly limited. The relative viscosity at 25° C. of a solution obtained by dissolving the polyamide in 96% concentrated sulfuric acid at a concentration of 1 g/dl is preferably 1.5 or more, more preferably 1.8 or more, further preferably 1.9 or more, and particularly preferably 2.0 or more. At the same time, the relative viscosity is preferably 5.0 or less, and more preferably 4.5 or less. If the relative viscosity is less than the lower limit, the mechanical strength of the resin composition tends to be lowered. On the other hand, if the relative viscosity exceeds the above upper limit, the fluidity of the resin composition tends to be lowered.

In the resin composition of the present invention, the lower limit of content of the resin ($C_{aff}$) which has the highest affinity for the carbon-based nanofiller (A) is not particularly limited, but is preferably 1% by volume or more, more preferably 3% by volume or more, further preferably 5% by volume or more, particularly preferably 10% by volume or more, and most preferably 14% by volume or more, relative to the total volume of the resin composition. Meanwhile, the upper limit of content of the high affinity resin ($C_{aff}$) is not particularly limited, as long as the high affinity resin ($C_{aff}$) forms the dispersed phase. However, the upper limit is preferably 85% by volume or less, more preferably 80% by volume or less, further preferably 70% by volume or less, particularly preferably 60% by volume or less, and most preferably 50% by volume or less. If the content of the high affinity resin ($C_{aff}$) is less than the lower limit, thermal conductive properties and insulating properties tend to be insufficiently improved, and the anisotropy of the thermal conductivity tends to be insufficiently suppressed. On the other hand, if the content exceeds the above upper limit, the insulating properties tend to be lowered.

Of the two or more resins (C) used in the present invention, the different resins (C1) from the high affinity resin ($C_{aff}$) are not particularly limited, and any resins which are shown as the examples of the resins (C) and which are not used as the high affinity resin ($C_{aff}$) are suitably used. However, from the viewpoint of improvement in thermal conductive properties, crystalline resins are preferable. Further, from the viewpoint of improvement in heat resistance, crystalline resins each having a melting point of 160° C. or more are more preferable, crystalline resins each having a melting point of 200° C. or more are further preferable, crystalline resins each having a melting point of 220° C. or more are particularly preferable, and crystalline resins each having a melting point 250° C. or more are most preferable. Examples of such crystalline resins include polyarylene sulfides (melting point: 280° C.), polyacetal (melting point: 165° C.), polyamides (melting point: 170° C. or more), polyester-based resins (melting point: 224° C. or more), liquid crystal polyesters (melting point 280° C. or more), and the like.

In the resin composition of the present invention, the content of the different resins (C1) is not particularly limited, but is preferably 10% by volume or more, more preferably 14% by volume or more, further preferably 20% by volume or more, particularly preferably 25% by volume or more, and most preferably 30% by volume or more, relative to the total volume of the resin composition. At the same time, the content is preferably 98% by volume or less, more preferably 96% by volume or less, further preferably 94% by volume or less, particularly preferably 90% by volume or less, and most preferably 85% by volume or less. If the content of the different resins (C1) is less than the lower limit, the insulating properties tend to be lowered. On the other hand, if the content exceeds the above upper limit, the thermal conductive properties tend to be lowered.

(D) Filler

The resin composition of the present invention may comprise a filler (D), if necessary. This improves the strength, the rigidity, the heat resistance, the thermal conductive properties, or the like of the resin composition. Such a filler (D) may be fibrous one or non-fibrous one such as particulate one. Specific examples of the filler (D) include glass fiber, carbon fiber, metal fiber, aramide fiber, cellulose fiber, asbestos, potassium titanate whisker, wollastonite, glass flake, glass beads, clay minerals represented by talc and montmorillonite, layered silicates represented by mica (isinglass) minerals and kaolinite minerals, silica, calcium carbonate, magnesium carbonate, silicon oxide, calcium oxide, zirconium oxide, calcium sulfate, barium sulfate, titanium oxide, aluminum oxide, dolomite, and the like. The content percentage of the filler in the resin composition of the present invention can not be generally specified, because the content percentage is varied depending on the type of the filler. However, for example, the content percentage is preferably 0.05% by volume or more, more preferably 0.1% by volume or more, and further preferably 1% by volume or more, relative to 100% by volume of the resin composition. At the same time, the content percentage is preferably 90% by volume or less, more preferably 80% by volume or less, further preferably 70% by volume or less, and particularly preferably 60% by volume or less.

Moreover, the resin composition of the present invention may comprise a thermally conductive filler as the filler (D). Examples of such a thermally conductive filler include alumina, boron nitride, aluminum nitride, silicon nitride, silicon carbide, crystalline silica, fused silica, diamond, zinc oxide, magnesium oxide, soft magnetic ferrite, and the like. The shape thereof is not particularly limited, but examples thereof include a particulate form, a tabular form, a rod shape, a fiber form, a tube form and the like. These thermally conductive fillers may be used alone or in combination of two or more kinds. The thermal conductivity of the thermally conductive filler is not particularly limited, but is preferably 1 W/mK or more, more preferably 5 W/mK or more, further preferably 10 W/mK or more, and particularly preferably 20 W/mK or more. In the resin composition of the present invention, the content percentage of the thermally conductive filler is not particularly limited, but is preferably 0.1% by volume or more, and also preferably 90% by volume or less, more preferably 80% by volume or less, further preferably 70% by volume or less, particularly preferably 50% by volume or less, and most preferably 40% by volume or less, relative to 100% by volume of the resin composition. If the content percentage of the thermally conductive filler is less than the lower limit, thermal conductive properties of the obtained molded product tend to be insufficiently improved. On the other hand, if the content percentage exceeds the above upper limit, the relative density of the resin composition tends to increase, and the fluidity thereof tends to be lowered.

(E) Dispersant

To the resin composition of the present invention, if necessary, a conventionally-known dispersant (E) (preferably, a vinyl-based polymer having an imide ring-containing constitutional unit, a vinyl-based polymer having a polycyclic aromatic group-containing vinyl-based monomer unit, a conjugated polymer, or the like) which is capable of improving the dispersibility of the carbon-based nanofiller (A) in the resin may be added. From the viewpoint of the dispersibility, heat resistance, and formability, the vinyl-based polymer having an imide ring-containing constitutional unit (hereinafter referred to as, an "imide ring-containing vinyl-based polymer") is particularly preferably added as the dispersant (E). This addition makes it possible to disperse the carbon-based nanofiller (A) in the dispersed phase in a state closer to a three-dimensionally uniform state. This addition also makes it possible to further improve the thermal conductive properties, with keeping the insulating properties thereof unchanged, to improve the fluidity (formability) of the resin composition, and to reduce the anisotropy of the thermal conductivity.

The imide ring-containing vinyl-based polymer may be formed of only imide ring-containing constitutional units or may contain imide ring-containing constitutional units and different vinyl-based monomer units.

Examples of the imide ring-containing constitutional units include maleimide-based monomer units represented by the following formula (I):

[Chem. 1]

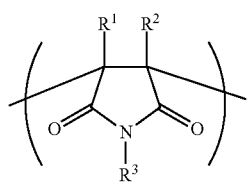

(I)

(wherein, $R^1$ and $R^2$ each independently represent a hydrogen atom or an alkyl group, and $R^3$ represents a hydrogen atom or a monovalent organic group such as an alkyl group, an alkynyl group, an aralkyl group, a cycloalkyl group, an aryl group, and an amino group); glutarimide group-containing constitutional units represented by the following formula (II):

[Chem. 2]

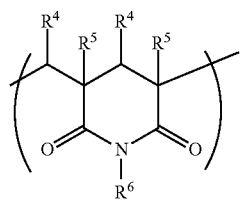

(II)

(wherein, $R^4$ and $R^5$ each independently represent a hydrogen atom or an alkyl group, and $R^6$ represents a hydrogen atom or a monovalent organic group such as an alkyl group, an alkynyl group, an aralkyl group, a cycloalkyl group, an aryl group, and an amino group); and the like.

These kinds of imide ring-containing constitutional units may be contained in the imide ring-containing vinyl-based polymer alone or in combination of two or more kinds. Of these imide ring-containing constitutional units, the maleimide-based monomer units are preferable, and at least one kind of an N-arylmaleimide monomer unit, an N-alkyl-substituted arylmaleimide monomer unit and an N-long-chain-alkylmaleimide monomer unit is particularly preferable When a vinyl-based polymer having such a maleimide monomer unit is used, the thermal resistance at the interface between the carbon-based nanofiller (A) and the high affinity resin ($C_{aff}$) in the dispersed phase tends to be lowered.

The content percentage of the imide ring-containing constitutional units in the imide ring-containing vinyl-based polymer is not particularly limited, but is preferably 20% by mass or more, more preferably 50% by mass or more, particularly preferably 70% by mass or more, and most preferably 80% by mass or more. If the content percentage of the imide ring-containing constitutional units is less than the lower limit, the amount thereof adsorbed to the carbon-based nanofiller (A) tends to decrease, and the adsorption stability tends to be lowered. Further, the heat resistance of the obtained resin composition tends to be lowered, and the anisotropy of the thermal conductivity tends to be insufficiently suppressed.

Examples of the different vinyl-based monomer used to form the different vinyl-based monomer units according to the present invention include vinyl-based macromonomers such as a polyalkylene oxide group-containing vinyl-based monomer, a polystyrene-containing vinyl-based monomer and polysiloxane-containing vinyl-based monomer; polycyclic aromatic group-containing vinyl-based monomers; unsaturated carboxylic acid ester monomers; vinyl-cyanide-based monomers; aromatic vinyl-based monomers; unsaturated carboxylic acid monomers, acid anhydrides thereof, and derivatives thereof; epoxy group-containing vinyl-based monomers; oxazoline group-containing vinyl-based monomers; amino group-containing vinyl-based monomers; amide group-containing vinyl-based monomers; hydroxyl group-containing vinyl-based monomers; siloxane structure-containing vinyl-based monomers; silyl group-containing vinyl-based monomers; and the like. These vinyl-based monomers may be used alone or in combination of two or more kinds.

Besides the different vinyl-based monomer, for example, a vinyl-based monomer such as an olefin-based monomer, a vinyl halide-based monomer, a carboxylic acid unsaturated ester monomer, a vinyl ether monomer, a cationic vinyl-based monomer, or an anionic vinyl-based monomer may be used. These vinyl-based monomers also may be used alone or in combination of two or more kinds.

Examples of the polycyclic aromatic group-containing vinyl-based monomer include one in which a polycyclic aromatic group is bonded to a vinyl-based monomer directly or with a divalent organic group interposed therebetween, one in which a polycyclic aromatic group is bonded to an amide group-containing vinyl-based monomer directly or with a divalent organic group interposed therebetween, and the like. Of these, a polycyclic aromatic group-containing vinyl-based monomer represented by the following formula (III) is preferable:

[Chem. 3]

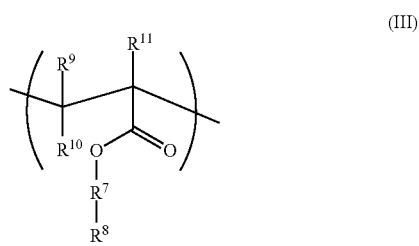

(III)

In the formula (III), $R^7$ represents a divalent organic group having 1 to 20 carbon atoms, $R^8$ represents a monovalent polycyclic aromatic-containing group, and $R^9$, $R^{10}$ and $R^{11}$ each independently represent a hydrogen or a monovalent organic group having 1 to 20 carbon atoms.

As $R^7$, a divalent organic group having 1 to 20 carbon atoms is preferable, and methylene, ethylene, propylene, butylene, pentamethylene, hexamethylene, or a substituted product thereof where one or more hydrogen atoms have been substituted by different atoms is more preferable. Butylene is particularly preferable, from the viewpoints of the adsorption capability and the adsorption stability to the carbon-based nanofiller (A) and from the viewpoint of polymerization reactivity during production by copolymerization. As $R^8$, naphthyl, naphthalenyl, anthracenyl, pyrenyl, terphenyl, perylenyl, phenanthrenyl, tetracenyl, pentacenyl, or a substituted product thereof where one or more hydrogen atoms have been substituted by different atoms is preferable. From the viewpoints of the adsorption capability and the adsorption stability to the carbon-based nanofiller (A), pyrenyl is particularly preferable. As $R^9$ and $R^{10}$, a hydrogen atom, an alkyl ester group, a carboxyl group or a carboxylate anion group is preferable, and a hydrogen atom is particularly preferable. As $R^{11}$, a hydrogen atom, a methyl group, an alkyl ester group or a carboxyl group is preferable, and a hydrogen atom or a methyl group is particularly preferable. In the present invention, such polycyclic aromatic group-containing vinyl-based monomer units may be contained alone or in combination of two or more kinds.

In the present invention, the imide ring-containing vinyl-based polymer may be mixed with the other components in producing the resin composition. It is preferable, however, that the imide ring-containing vinyl-based polymer be premixed with the carbon-based nanofiller (A) by being mixed in an organic solvent, by melt kneading, or by another method, to thereby form a composite with the carbon-based nanofiller, and then the composite and the other components be mixed to thereby prepare the resin composition of the present invention. According to the latter method, the fluidity of the obtained resin composition can be reduced, and the thermal conductivity thereof can be made less anisotropic.

(Other Additive)

The resin composition of the present invention may comprise an electroconductive material such as a metal, a metal compound represented by a metal oxide and a metal hydroxide, carbon black, and an electroconductive polymer represented by polyaniline, polypyrrole, polyacetylene, poly(paraphenylene), polythiophene and polyphenylene vinylene; a filler coated with the electroconductive material; or the like. The metal is not particularly limited, but examples thereof include gold, silver, copper, aluminum, iron, platinum, magnesium, molybdenum, rhodium, zinc, palladium, tungsten, chromium, cobalt, nickel, tin, titanium, silicon metal, and the like; and alloys thereof. The shape of the metal and the metal compound is not particularly limited, but examples thereof include a particulate form, a tabular form, a rod shape, a fiber form, a tube form and the like.

The amount of the electroconductive material and the filler coated with the electroconductive material added is not particularly limited, but is preferably within the range where the insulating properties (the volume resistivity is preferably $10^{13}$ $\Omega \cdot cm$ or more) are maintained. Besides this, the distribution morphology of the electroconductive material and the filler coated with the electroconductive material is not particularly limited. From the viewpoint that an effect of the addition thereof is achieved despite that the insulating properties are maintained, however, at least part thereof is preferably contained in the dispersed phase formed from the high affinity resin ($C_{aff}$), and a half or more thereof is more preferably contained in the dispersed phase formed from the high affinity resin ($C_{aff}$).

Further, another component may be added to the resin composition of the present invention, and examples thereof include metal salt stabilizing agents such as copper chloride, copper(I) iodide, copper acetate, and cerium stearate; antioxidants such as hindered amine-based, hindered phenol-based, sulfur-containing compound-based, and acrylate-based antioxidants, and phosphorus-based organic compounds; heat stabilizer; benzophenone-based, salicylate-based, benzotriazole-based ultraviolet absorbers and the like; weathering agents; light stabilizers; mold release agents; lubricants; nucleating agents; viscosity modifiers; colorants; surface treating agents such as silane-coupling agents; pigments; fluorescent pigments; dyes; fluorescent dyes; color protection agents; plasticizer; flame retardants (red phosphorus, metal hydroxide-based flame retardants, phosphorus-based flame retardants, silicone-based flame retardants, halogen-based flame retardants, combinations of these, halogen-based flame retardants and antimony trioxide, and the like); wood powder; hull powder; nut powder; used paper; phosphorescent pigments; borate glass; antibacterial agents such as silver-based antibacterial agents; antifungal agents; corrosion prevention agents for mold such as hydrotalcites represented by magnesium-aluminum hydroxy hydrates.

<Resin Composition and Method for Producing the Same>

Next, a method for producing the resin composition of the present invention will be described. Examples of the method for producing the resin composition of the present invention include a method of uniformly mixing the carbon-based nanofiller (A), the modified polyolefin-based polymer (B), the resin ($C_{aff}$) which has the highest affinity for the carbon-based nanofiller (A), the different resins (C1), and, if necessary, the filler (D), the dispersant (E), and the other additive by use of a high-speed agitator or the like, then mixing the mixture by means of melt kneading using a extruder; a method of mixing the abovementioned components by means of melt kneading using a Banbury mixer or a rubber roller; and the like.

The extruder is not particularly limited, as long as the extruder has a sufficient kneading capability, and examples thereof include a single-screw or multiple-screw extruder with a vent.

The shape of each of the components is not particularly limited, and a component may be used in any form of a pellet form, a powder form, a small piece form, and the like. Other examples of the method for producing the resin composition of the present invention include a method of mixing all components at once; a method of premixing specific components, and then mixing the premixed components with the remaining components. In particular, a method of premixing the carbon-based nanofiller (A) and the high affinity resin ($C_{aff}$), and then mixing the premixed components with the remaining components is preferable, from the viewpoints that the phase structure according to the present invention is favorably formed, and that the obtained resin composition has both thermal conductive properties and insulating properties. Furthermore, a method of premixing the carbon-based nanofiller (A), the modified polyolefin-based polymer (B) and the high affinity resin ($C_{aff}$), and then mixing the premixed components with the remaining components is more preferable. In these production methods, the carbon-based nanofiller (A) and the high affinity resin ($C_{aff}$) and more preferably further the modified polyolefin-based polymer (B) may be premixed by melt kneading or the like using an extruder or the like, and then the remaining components may be added and mixed by melt kneading or the like; alternatively, the carbon-based nanofiller (A) and the high affinity resin ($C_{aff}$), and more preferably further the modified polyolefin-based polymer (B) may be fed through a hopper located upstream of an extruder provided with one or multiple side feeders, and melt-kneaded in advance, and thereafter, each remaining component may be fed through the one or multiple side feeders and then melt-kneaded. Further, regarding to the remaining components, it is also preferable to feed the filler (D) and the other additive through a side feeder located downstream of a inlet port through which the different resin (C1) is fed, from the viewpoint of improvement in mechanical properties and thermal conductive properties. Moreover, the filler (D) and the other additive are preferably added in the last place separately using a single-screw extruder or a twin-screw extruder which is set to a screw arrangement with lower kneading capability. In a case of using the dispersant (E), a more preferable method is a method of premixing the carbon-based nanofiller (A) and the dispersant (E) to form a composite, then mixing the composite with the high affinity resin ($C_{aff}$) and preferably further with the modified polyolefin-based polymer (B), and subsequently mixing the remaining components therewith.

The resin composition of the present invention thus prepared comprises the dispersed phase formed from the high affinity resin ($C_{aff}$) and the continuous phase formed from the different resins (C1) as described above. In the resin composition, at least part of the modified polyolefin-based polymer (B) is present at the interface between the dispersed phase and the continuous phase, while the carbon-based nanofiller (A) is present at the dispersed phase. As a result, the thermal conductive properties and the insulating properties tend to be improved. Note that, in the resin composition of the present invention, the dispersed phase means portions formed by the high affinity resin ($C_{aff}$) which is encompassed by the different resins (C1).

The thermal conductivity of the resin composition of the present invention comprising such a phase structure is not particularly limited, but is preferably 0.3 W/mK or more, more preferably 0.4 W/mK or more, particularly preferably 0.5 W/mK or more, and most preferably 0.6 W/mK or more. In addition, the volume resistivity is not particularly limited, but is preferably $10^{13}$ Ω·cm or more, more preferably $10^{14}$ Ω·cm or more, particularly preferably $10^{15}$ Ω·cm or more, and most preferably $10^{16}$ Ω·cm or more.

FIG. 1 schematically shows the phase structure of such a resin composition; however, the phase structure of the resin composition of the present invention is not limited thereto. A dispersed phase 3 is formed from the resin ($C_{aff}$) which has the highest affinity for the carbon-based nanofiller (A). The dispersed phase 3 may contain another resin which has affinity for the carbon-based nanofiller (A). In addition, the number of pieces of the carbon-based nanofiller ($A_{dsp}$) 1 contained in each piece of the dispersed phase 3 is not particularly limited, and the number may be one or plural. When multiple pieces of the carbon-based nanofiller ($A_{dsp}$) 1 are present in the dispersed phase 3, the dispersion state thereof is not particularly limited. The pieces of the carbon-based nanofiller ($A_{dsp}$) 1 may be in contact with each other, but are not necessarily in contact with each other. Furthermore, the pieces may be in complete contact with each other, or may be dispersed in completely isolated state. However, from the viewpoint that the thermal conductivity becomes less anisotropic, long axis directions of pieces of the carbon-based nanofiller ($A_{dsp}$) 1 are preferably present more three dimensionally. The shape of the dispersed phase 3 is not particularly limited, and may be completely circular or non-circular, that is, streaked, polygonal, elliptical, or the like.

The continuous phase 4 is formed from the one or more resins (C1) other than the high affinity resin ($C_{aff}$). As long as the dispersed phase 3 and the continuous phase 4 are formed, the continuous phase 4 may contain the high affinity resin ($C_{aff}$). In addition, although the continuous phase 4 may contain the carbon-based nanofiller (A), the content thereof is preferably within the range where the resin composition maintains the insulating properties (the volume resistivity being preferably $10^{13}$ Ω·cm or more), in applications where insulating properties are required.

In the resin composition of the present invention, at least part of (preferably, all of) the modified polyolefin-based polymer (B) is present at the interface between the dispersed phase 3 and the continuous phase 4. This modified polyolefin-based polymer (B) present at the interface preferably acts as a shell of the dispersed phase 3. Such action of the modified polyolefin-based polymer (B) as the shell of the dispersed phase 3 makes it highly likely that the carbon-based nanofiller (A) is localized and encapsulated in the dispersed phase 3. In addition, such action makes it possible to prevent a formation of an electrically conductive path, which would be formed in such a way that the carbon-based nanofiller ($A_{dsp}$) in the dispersed phase 3 is exposed from the dispersed phase 3 during melt processing, and is brought in contact with the carbon-based nanofiller (A) in the continuous phase 4. Moreover, the thermal resistance at the interface tends to be further reduced, and thereby the thermal conductive properties of the resin composition are further improved, and, at the same time, the insulating properties at the interface tend to be further improved. In addition, various properties such as the thermal conductive properties tend to be less anisotropic.

In the meantime, in a case where a resin having reactive functional groups such as terminal reactive groups is used as at least one of the two or more resins (C), at least part of (preferably, all of) the functional groups of the modified polyolefin-based polymer (B) are preferably bonded to reactive functional groups in the high affinity resin ($C_{aff}$) and/or the different resins (C1) by means of chemical reaction, from the viewpoint of improvement in thermal conductive properties. In particular, in a case where a polyethylene-based resin is used for the dispersed phase, and polyphenylene sulfide is used for the continuous phase, when an epoxy-modified polyethylene-based polymer is used as the modified polyolefin-based polymer (B), the thermal conductive properties tend to be highest. It is speculated that this is because thermal resistance at the interface is reduced in the following manner. Specifically, the speculation is that SNa groups of polyphenylene sulfide, SH groups produced from the SNa groups thereof through an acid treatment or the like, amino groups or carboxyl groups which are introduced during production or through a post-treatment, or terminal groups formed as a result of reaction of N-methylpyrrolidone used in production are reacted with epoxy groups in the epoxy-modified polyethylene in situ, i.e., during melt processing or the like, and part or all of the reaction products formed in such a reaction are most stably present at the interface between the polyethylene-based resin and the polyphenylene sulfide, to thereby reduce the thermal resistance at the interface.

The phase structure of such a resin composition can be found by observation using a scanning electron microscope or a transmission electron microscope. In particular, when reaction products are produced at the interface by a reaction of the modified polyolefin-based polymer (B) with the high affinity resin ($C_{aff}$) and/or the different resins (C1), an interface layer formed from the reaction products can be found by observation using a transmission electron microscope or a scanning force microscope (for example, elastic modulus mode or the like).

In the present invention, the ratio (Y/X), where X (unit: % by volume) represents a ratio of the dispersed phase to the whole resin composition, and Y (unit: % by volume) represents a ratio of a carbon-based nanofiller ($A_{dsp}$) contained in the dispersed phase to all the carbon-based nanofiller (A), is preferably 1.5 or more, more preferably 1.6 or more, further preferably 1.7 or more, still further preferably 1.8 or more, particularly preferably 1.9 or more, and most preferably 2.0 or more. If the value Y/X is less than the lower limit, the insulating properties tend to be lowered.

The ratio Y of the carbon-based nanofiller ($A_{dsp}$) contained in the dispersed phase to all the carbon-based nanofiller (A) is not particularly limited, but is preferably 20% by volume or more, more preferably 40% by volume or more, further preferably 50% by volume or more, particularly preferably 80% by volume or more, and most preferably 100% by volume. If the ratio Y is lower than the lower limit, the thermal conductive properties and the insulating properties tend to be lowered.

Moreover, in the present invention, a ratio Z of the dispersed phase containing the carbon-based nanofiller ($A_{dsp}$) to the whole resin composition is not particularly limited, but is preferably 1% by volume or more, more preferably 3% by volume or more, further preferably 5% by volume or more, particularly preferably 7% by volume or more, and most preferably 10% by volume or more. At the same time, the ratio Z is preferably 85% by volume or less, more preferably 80% by volume or less, further preferably 70% by volume or less, particularly preferably 60% by volume or less, and most preferably 50% by volume or less. If the ratio Z is less than the lower limit, the thermal conductive properties and the insulating properties tend to be lowered, and the thermal conductivity tends to be more anisotropic. On the other hand, if the ratio Z exceeds the above upper limit, the fluidity of the resin composition tends to be lowered.

In the resin composition of the present invention, a ratio W of the modified polyolefin-based polymer (B) present at the interface between the dispersed phase and the continuous phase (including the modified polyolefin-based polymer (B) reacted with the high affinity resin ($C_{aff}$) and/or the different resins (C1)) to the whole modified polyolefin-based polymer (B) is not particularly limited, but is preferably 20% by volume or more, more preferably 50% by volume or more, further preferably 60% by volume or more, particularly preferably 80% by volume or more, and most preferably 100% by volume. If the ratio W is less than the lower limit, the insulating properties tend to be lowered, and the thermal conductivity tends to be more anisotropic.

Note that, in the present invention, the values W, X, Y and Z are determined on the basis of a scanning electron microscope (SEM) photograph as follows. Specifically, a molded product with a predetermined thickness is formed from the resin composition of the present invention. Then, a photograph of an arbitrary region within the central part of the molded product (at a depth ranging from 40 to 60% of the total thickness from a surface) is taken by using a scanning electron microscope (SEM), and the image is developed onto a sheet of photographic paper with a uniform thickness. Three regions with a size corresponding to a size of 90 µm×90 µm of the molded product are sampled at random from the obtained SEM photograph. The mass of the sampled region is measured. A predetermined part (the carbon-based nanofiller, the dispersed phase, or the like) is cut off from one of the sampled region, the mass of the cut-off part of the photograph are measured, and then, the mass ratio (% by mass) of the predetermined part of the photograph is calculated. The mass ratio of the photograph can be regarded as the actual volumetric ratio (% by volume) of the predetermined part, because the photographic paper used has a uniform thickness. Such a volumetric ratio is determined for each of the three regions sampled at random, and the average value thereof is regarded as a value W, X, Y or Z (% by volume).

In the resin composition of the present invention, the number average value of the diameters or the major axis lengths of pieces of the dispersed phase is not particularly limited, but is preferably 50 nm or more, more preferably 100 nm or more, further preferably 500 nm or more, particularly preferably 1 µm or more, and most preferably 2 µm or more. At the same time, the number average value is preferably 200 µm or less, and more preferably 100 µm or less. If the number average value of the diameters or the major axis lengths of pieces of the dispersed phase is less than the lower limit, the thermal conductive properties and the insulating properties tend to be lowered, and the thermal conductivity tends to be more anisotropic. On the other hand, if the number average value exceeds the above upper limit, the mechanical strength of the resin composition tends to be lowered.

The thickness of the reaction product of the modified polyolefin-based polymer (B) with the high affinity resin ($C_{aff}$) and/or the different resins (C1) is not particularly limited, but is preferably 1 nm or more, more preferably 5 nm or more, further preferably 10 nm or more, particularly preferably 20 nm or more, and most preferably 50 nm or more. If the thickness of the reaction product is less than the lower limit, the insulating properties tend to be lowered, and the thermal conductivity tends to be more anisotropic.

Note that, in the present invention, the diameter or the major axis length of each piece of the dispersed phase and the thickness of the reaction product are values which are determined in such a way that three regions with a size corresponding to a size of 90 µm×90 µm of the molded product are sampled at random from an electron microphotograph, then the measurement is performed, and the measured values are averaged.

A method of processing such a resin composition of the present invention into a molded product is not particularly limited, but a melt molding process is preferable. Examples of such a melt molding method include conventionally-known molding methods such as injection molding, extrusion molding, blow molding, press molding, compression molding and gas-assist molding. The orientation of the carbon-based nanofiller (A) and the resins (C) can be controlled by application of a magnetic field, an electric field, an ultrasonic wave, or the like during the molding process.

The resin composition of the present invention is less likely to exhibit anisotropy of various properties (for example, thermal conductivity), even when subjected to processing under shear. Here, the term "under shear" represents a state where a force (shearing force) which causes shear inside an object is given to the object, and examples of the processing under shear include injection molding, extrusion molding, blow molding, and the like. For example, supposing that a resin composition is subjected to injection molding, when pushed out through a nozzle of an injection molding machine, the resin composition is subjected to a force which is parallel but opposite to the injection direction (the flow direction), and slippage or shearing occurs at a certain cross-section of the resin composition. As a result, in a conventional resin composition comprising no modified polyolefin-based polymer (B), the carbon-based nanofiller (A) is orientated in the flow direction, and anisotropy of various properties (for example, thermal conductivity) are exhibited in the obtained molded product. On the other hand, in the resin composition of the present invention, the dispersed phase containing the carbon-based nanofiller (A) is dispersed in a state closer to a three-dimensionally uniform state. As a result, even when subjected to processing under shear, the carbon-based nanofiller (A) is less likely to be orientated, anisotropy of various properties (for example, thermal conductivity) are less likely to be exhibited in the obtained molded product, and properties such as thermal conductive properties tend to take a state closer to a three-dimensionally uniform state.

Note that, since shearing force in press molding is significantly smaller than that in injection molding, a carbon nanocomposite, a carbon nanostructure, and resins are much less orientated in a press-molded product. Accordingly, anisotropy of various properties of a press-molded product are extremely small. For this reason, in the present invention, a ratio of a physical property value (for example, thermal conductivity) of a injection-molded product in the thickness direction thereof relative to a physical property value (for example, thermal conductivity) of a press-molded product in the thickness direction thereof is determined. On the basis of the ratio of the physical property values, anisotropy of properties (for example, thermal conductive properties) exhibited by a resin composition are quantitatively evaluated. For example, it can be said that the closer to 1 the ratio of physical property values of a resin composition is, the less anisotropy of properties such as thermal conductive properties the resin composition has, and the closer to a three-dimensionally uniform state the resin composition is.

EXAMPLES

Hereinafter, the present invention will be described in further details on the basis of Examples and Comparative Examples; however, the present invention is not limited to the following Examples. Incidentally, physical properties of each resin composition obtained were determined in accordance with the following methods.

(1) Relative Density

A resin composition was press-molded at a molding temperature shown in Table 1, and the relative density of the obtained molded product was determined by an in-water substitution method.

(2) Volume Resistivity

A resin composition in a pellet form was vacuum-dried under conditions shown in Table 1, and then press-molded at a molding temperature shown in Table 1. Thus, a molded product with a thickness of 2 mm was obtained. A disc-like sample with a diameter of 100 mm and a thickness of 2 mm was cut out of this molded product, and a voltage of 500 V was applied to the sample by using a high-resistance meter ("AGILENT 4339B" manufactured by Agilent Technologies) in accordance with JIS K 6911. After one minute, the volume resistivity was measured.

(3) Thermal Conductivity

A resin composition in a pellet form was vacuum-dried under conditions shown in Table 1, and then press-molded at a molding temperature shown in Table 1. Thus, a molded product with a thickness of 2 mm was obtained. A sample of 25 mm×25 mm×2 mm was cut out of this molded product. The thermal conductivity (W/mK) in the thickness direction of the sample was measured at 40° C. (the temperature difference between upside and downside was 24° C.) by use of a steady method thermal conductivity measuring instrument ("GH-1" manufactured by ULVAC-RIKO, Inc.).

(4) Anisotropy of Thermal Conductivity

A resin composition in a pellet form was vacuum-dried under conditions shown in Table 1, and then injection-molded under conditions shown in Table 1. Thus, a molded product with a thickness of 2 mm was obtained. A sample of 25 mm×25 mm×2 mm was cut out of this molded product. The thermal conductivity (W/mK) in the thickness direction of the sample was measured at 40° C. (the temperature difference between upside and downside was 24° C.) by use of the steady method thermal conductivity measuring instrument ("GH-1" manufactured by ULVAC-RIKO, Inc.).

An anisotropy of thermal conductivity was determined from the thermal conductivity (W/mK) in the thickness direction of this injection-molded product and the thermal conductivity (W/mK) in the thickness direction of the press-molded product measured in the item (3) by using the following equation:

Anisotropy of thermal conductivity=(Thermal conductivity in thickness direction of injection-molded product)/(Thermal conductivity in thickness direction of press-molded product measured in the item (3))

Note that, in a press-molded product, thermal conductivities in the thickness direction and in a direction perpendicular thereto, respectively, hardly differ. Accordingly, it can be said that the closer to 1 the aforementioned ratio of the thermal conductivities is, the less oriented in the flow direction the carbon-based nanofiller is during injection molding, and the smaller the anisotropy is.

(5) Y/X Value

A resin composition in a pellet form was vacuum-dried under conditions shown in Table 1, and then press-molded at a molding temperature shown in Table 1. Thus, a molded product with a thickness of 2 mm was obtained. A photograph of an arbitrary region within the central part of the molded product (within the range of 0.8 to 1.2 mm away from the surface) was taken by using a scanning electron microscope (SEM), and the image was developed onto a sheet of photographic paper with a uniform thickness. Three regions with a size corresponding to a size of 90 μm×90 μm of the molded product were sampled at random from the obtained SEM photograph. The mass of the photograph of one of the sampled region was measured. Thereafter, part corresponding to the dispersed phase formed from the high affinity resin ($C_{aff}$) was cut out of the sampled region, and the mass of the cut-out part of the photograph was measured, and the mass ratio (% by mass), of the photograph, of the part corresponding to the dispersed phase relative to the whole sampled region was calculated. The mass ratio in the photograph can be regarded as the volumetric ratio (% by volume) of the dispersed phase relative to the resin composition within the sampled range, because the photographic paper used had a uniform thickness. In the following Examples and Comparative Examples, the volumetric ratio of the dispersed phase was determined for each of the three regions sampled at random, and the average value of the volumetric ratios was regarded as the ratio X (unit: % by volume) of the dispersed phase to the whole resin composition.

A SEM photograph was taken in the same manner as described above, and three regions (each of which was a region with a size corresponding to a size of 90 μm×90 μm of the molded product) were sampled at random from the obtained SEM photograph. All parts corresponding to the carbon-based nanofiller (A) were cut out of one of the sampled regions of the photograph, and the total mass of the cut-out parts of the photograph was measured. Moreover, of the parts corresponding to the carbon-based nanofiller (A), the mass of parts of the photograph corresponding to the carbon-based nanofiller ($A_{dsp}$) contained in the dispersed phase was measured. Then, within the sampled region, the mass ratio (% by mass), of the photograph, of the carbon-based nanofiller ($A_{dsp}$) in the dispersed phase relative to all the carbon-based nanofiller (A) was calculated. Also in this case, in a similar manner as described above, the mass ratio of the photograph can be regarded as the volumetric ratio (% by volume) of the carbon-based nanofiller ($A_{dsp}$) contained in the dispersed phase relative to all the carbon-based nanofiller (A) within the sampled region. In the following Examples and Comparative Examples, the volumetric ratio of the carbon-based nanofiller ($A_{dsp}$) in the dispersed phase was determined for each of the three regions sampled at random, and the average value of the volumetric ratios was regarded as the ratio Y (unit: % by volume) of the carbon-based nanofiller ($A_{dsp}$) in the dispersed phase relative to all the carbon-based nanofiller (A) in the resin composition.

The value Y/X was determined from the values X and Y thus calculated.

TABLE 1

|  | Vacuum-drying conditions | | Molding conditions | |
| --- | --- | --- | --- | --- |
|  | Temp. | Time | Molding Temp. | Mold Temp. |
| A case where the resin (C1) was polyphenylene sulfide | 130° C. | 6 hours | 300° C. | 130° C. |
| A case where the resin (C1) was a polyamide | 80° C. | 12 hours | 270° C. | 130° C. |
| A case where the resin (C1) was polycarbonate | 120° C. | 6 hours | 280° C. | 80° C. |
| A case where the resin (C1) was polymethyl methacrylate | 80° C. | 6 hours | 250° C. | 60° C. |
| A case where only polyethylene was used as the resins | 60° C. | 12 hours | 200° C. | 50° C. |

Carbon-based nanofillers (A), modified polyolefin-based polymers (B), resins (C) used in Examples and Comparative Examples are shown below. Note that the G/D value of each carbon-based nanofiller (A) was determined as follows. Specifically, a measurement was performed by using a laser raman spectroscopy system ("NRS-3300" manufactured by JASCO Corporation) at an excitation laser wavelength of 532 nm, and the G/D value was determined on the basis of peak intensities of the G band observed at around 1585 cm$^{-1}$ and the D band observed at around 1350 cm$^{-1}$ in the raman spectrum.

(A) Carbon-Based Nanofiller:

Carbon-Based Nanofiller (a-1)

Multi-walled carbon nanotube ("MWNT-7" manufactured by Nano Carbon Technologies Co., Ltd, average diameter: 80 nm, aspect ratio: 100 or more, G/D value: 8.0, specific gravity: 2.1).

Carbon-Based Nanofiller (a-2)

Carbon nanofiber ("VGCF" manufactured by SHOWA DENKO K.K., average diameter: 150 nm, aspect ratio: 60, G/D value: 9.6, specific gravity: 2.1).

Carbon-Based Nanofiller (a-3)

Carbon nanofiber ("VGCF-S" manufactured by SHOWA DENKO K.K., average diameter: 80 nm, aspect ratio: 100 or more, G/D value: 10.0, specific gravity: 2.1).

(B) Modified Polyolefin-Based Polymer:

Modified Polyolefin-Based Polymer (b-1)

Epoxy-modified polyethylene ("BONDFAST-E" manufactured by Sumitomo Chemical Co., Ltd, glycidyl methacrylate content: 12% by mass, specific gravity: 0.94).

Modified Polyolefin-Based Polymer (b-2)

Epoxy-modified polyethylene-g(graft)-polystyrene ("MODIPER A4100" manufactured by NOF CORPORATION, glycidyl methacrylate content: 10.5% by mass, polystyrene content: 30% by mass, specific gravity: approximately 0.97).

Modified Polyolefin-Based Polymer (b-3)

Epoxy-modified polyethylene-g(graft)-polymethyl methacrylate ("MODIPER A4200" manufactured by NOF CORPORATION, glycidyl methacrylate content: 10.5% by mass, polymethyl methacrylate content: 30% by mass, specific gravity: approximately 1.0).

($C_{aff}$) Resin which has High Affinity for Carbon-Based Nanofiller (A):

Resin ($c_{aff}$-1)

Polyethylene (high density polyethylene "NOVATEC HD HY430" manufactured by Japan Polyethylene Corporation, melt flow rate measured in accordance with JIS K6922-1: 0.8 g/10 min, specific gravity: 0.96).

Resin ($C_{aff}$-2)

Polyethylene (high density polyethylene "NOVATEC HD HJ590N" manufactured by Japan Polyethylene Corporation, melt flow rate measured in accordance with JIS K6922-1: 40 g/10 min, specific gravity: 0.96).

Resin ($c_{aff}$-3)

Polyethylene (high density polyethylene "SUNFINE LH-411" manufactured by Asahi Kasei Chemicals Corporation, melt flow rate measured in accordance with JIS K6922-1: 8 g/10 min, specific gravity: 0.95).

Resin ($c_{aff}$-4)

Polyethylene (high density polyethylene "SUNTEC-HD S360P" manufactured by Asahi Kasei Chemicals Corporation, melt flow rate measured in accordance with JIS K6922-1: 0.8 g/10 min, specific gravity: 0.96).

Resin ($c_{aff}$-5)

Polyamide (nylon 6 "1022B" manufactured by Ube Industries, Ltd, specific gravity: 1.14).

(C1) Different Resin:

Resin (c1-1)

Polyphenylene sulfide ("product number: 427268" manufactured by Sigma-Aldrich Corporation, an unreinforced-type linear polyphenylene sulfide whose melt viscosity measured by use of a viscoelasticity measuring apparatus "ARES-G2" manufactured by TA Instruments (a jig for measurement: a cone plate with 25 mmφ, and 0.1 rad) at a temperature of 310° C. and at a shear rate of 1000 sec$^{-1}$ is 25 Pa·s, relative density measured in accordance with the method described in the item (1): 1.36).

Resin (c1-2)

Polyamide (aromatic polyamide "nylon-MXD6 S6121" manufactured by MITSUBISHI GAS CHEMICAL COMPANY, INC., relative density measured in accordance with the method described in the item (1): 1.22).

Resin (c1-3)

Polycarbonate ("IUPILON 52000" manufactured by Mitsubishi Engineering-Plastics Corporation, relative density measured in accordance with the method described in the item (1): 1.2).

Resin (c1-4)

Polymethyl methacrylate ("SUMIPEX LG" manufactured by Sumitomo Chemical Co., Ltd, relative density measured in accordance with the method described in the item (1): 1.2).

(D) Filler:

Insulating Thermally Conductive Filler (d-1)

High-purity synthetic spherical alumina ("AO-800" manufactured by Admatechs Company Limited, specific gravity: 3.6).

Insulating Thermally Conductive Filler (d-2)

Spherical boron nitride ("FS-3" manufactured by MIZUSHIMA FERROALLOY CO., LTD., specific gravity: 2.26).

(E) Dispersant:

Maleimide-Based Polymer (e-1)

Into a reaction vessel equipped with a stirrer and a reflux condenser, 30 parts by mass of styrene, 0.4 parts by mass of 2,2'-azobisisobutyronitrile and 200 parts by mass of methyl ethyl ketone were charged. The temperature of the solution was raised to 75° C. with stirring at 200 rpm under a nitrogen stream. Thereafter, while the temperature was being kept at 75° C., 40 parts by mass of N-phenyl maleimide, 30 parts by mass of styrene and 300 parts by mass of methyl ethyl ketone were added at a constant rate over 2 hours. Further, the mixture was kept at 75° C. for 2 hours, and thus the polymerization was completed. After cooled to 30° C., the solution was poured into 5 times equivalent amount of methanol, and purification was performed by reprecipitation. The precipitates were vacuum-dried to thereby completely remove the solvent. Thus, a maleimide-based polymer (e-1) was obtained.

This maleimide-based polymer (e-1) was dissolved in deuterated chloroform, and subjected to a $^{13}$C-NMR determination under conditions of a room temperature and 100 MHz. An integration value of the obtained peak for each of constitutional units was determined, and the molar ratio of each of the constitutional units was determined from the ratio of integration values. Then, the molar ratios were converted to mass ratios. The results showed that styrene units were 50% by mass, and that N-phenyl maleimide units were 50% by mass.

Further, 2 mg of the maleimide-based polymer (e-1) was dissolved in 2 ml of chloroform. Then, the number average molecular weight of the maleimide-based polymer (e-1) was measured under a condition of a column temperature of 40° C. by using a gel permeation chromatograph (hereinafter abbreviated as "GPC," "Shodex GPC-101" manufactured by SHOWA DENKO K.K., pump: "DU-H7000" manufactured by SHOWA DENKO K.K., columns: three columns of "K-805L"s manufactured by SHOWA DENKO K.K. were connected in series). As a detector, an ultraviolet detector ("RI-71S" manufactured by SHOWA DENKO K.K.) was used. The number average molecular weight and a molecular weight distribution were determined as standard polystyrene equivalent values. As a result, the number average molecular weight of the maleimide-based polymer (e-1) was 33000, and the molecular weight distribution was 4.1.

Example 1

Figure 2A:
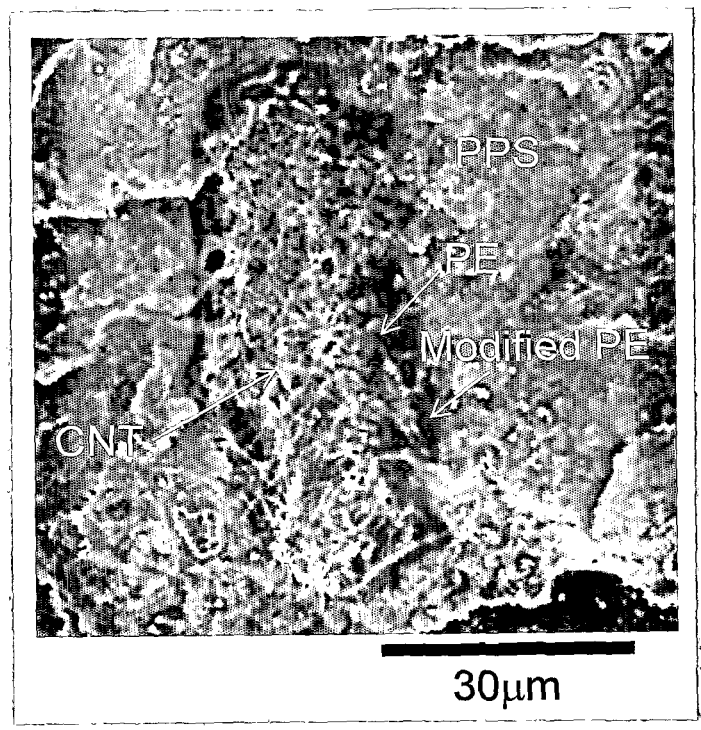
FIG. 2A is a scanning electron micrograph of a freeze-fracture surface at a very central part of a molded product of a resin composition obtained in Example 1.
Figure 2B:
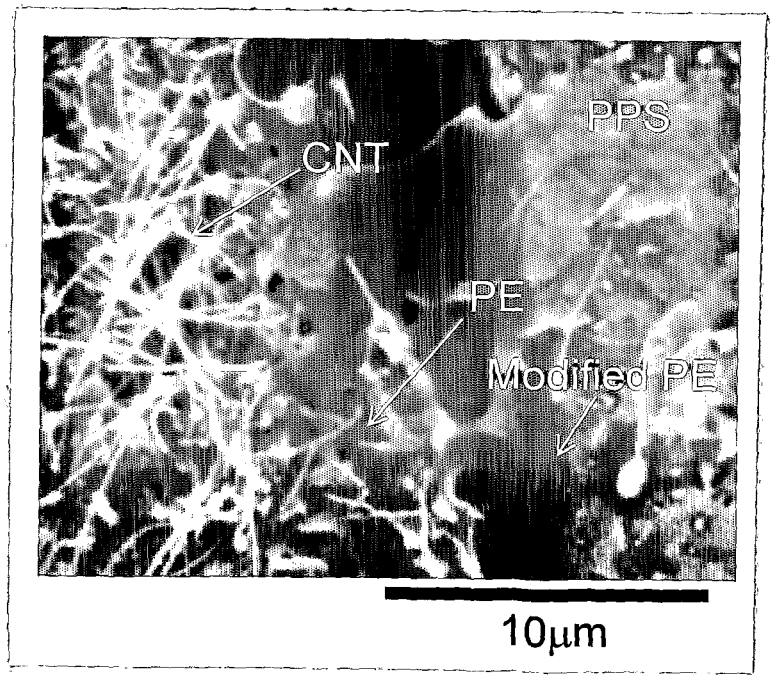
FIG. 2B is a scanning electron micrograph of the freeze-fracture surface at the very central part of the molded product of the resin composition obtained in Example 1.
Figure 3A:
FIG. 3A is a transmission electron micrograph of an ultrathin section of a very central part of the molded product of the resin composition obtained in Example 1.
Figure 3B:
FIG. 3B is a transmission electron micrograph of the ultrathin section of the very central part of the molded product of the resin composition obtained in Example 1.
Figure 4:
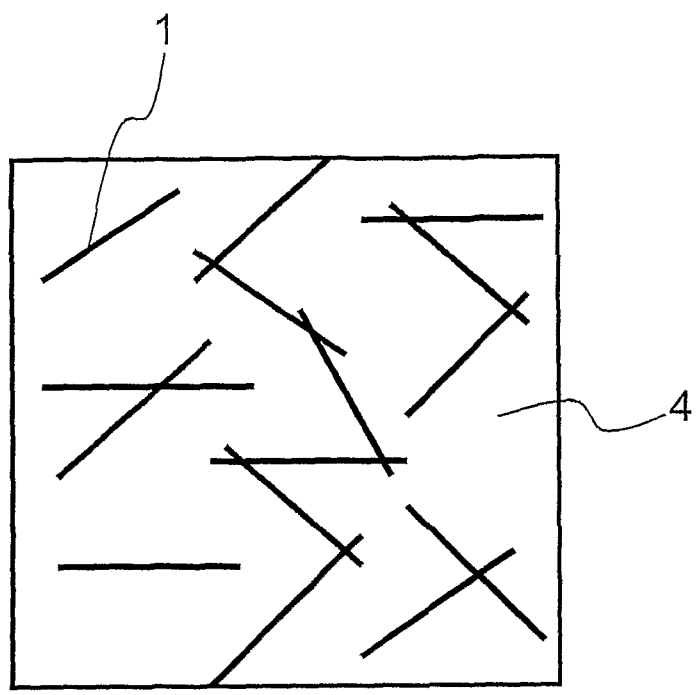
FIG. 4 is a schematic diagram showing a state of a conventional resin composition comprising a carbon-based nanofiller.

Relative to 100% by volume of the total of all components, 1% by volume of the carbon-based nanofiller (a-1), 7% by volume of the modified polyolefin-based polymer (b-1), 21% by volume of the resin ($c_{aff}$-1) and 71% by volume of the resin (c1-1) were blended. The blended components were fed into a twin-screw melt kneading extruder with a vent (manufactured by TECHNOVEL CORPORATION, screw diameter: 15 mm, L/D: 60), and melt-kneaded under conditions of a cylinder setting temperature of 290° C. and a screw rotation rate of 100 rpm. The discharged kneaded material was extruded into a strand shape, and cut with a cutter after being cooled. Thus, a resin composition in a pellet form was obtained. The Y/X value, volume resistivity, relative density, thermal conductivity and anisotropy of the thermal conductivity of this resin composition were measured in accordance with the aforementioned methods. Table 2 shows the results. In addition, FIG. 2A shows a SEM photograph of a freeze-fracture surface at the very central part of the molded product, the SEM photograph being taken for determining the Y/X value, and FIG. 2B shows an enlarged photograph thereof. Further, FIG. 3A shows a TEM photograph of an ultrathin section at the very central part of the molded product, and FIG. 3B shows an enlarged photograph thereof. Note that CNT represents carbon nanotube, PE represents polyethylene, and PPS represents polyphenylene sulfide. Also note that the molded product was stained with ruthenium tetraoxide prior to taking the TEM photograph.

Example 2 to 17 and 21

Each resin composition in a pellet form was obtained in the same manner as in Example 1, except that a carbon-based nanofiller, a modified polyolefin-based polymer, a high affinity resin, a different resin, a filler and a dispersant were used in a corresponding combination and corresponding blending amounts shown in Table 2. The Y/X value, volume resistivity, relative density, thermal conductivity and anisotropy of the thermal conductivity of each of the resin compositions were measured in accordance with the aforementioned methods. Table 2 shows the results.

Example 18

A resin composition in a pellet form was obtained in the same manner as in Example 15, except that 62% by volume of the resin (c1-2) was used in place of the resin (c1-1), and that the cylinder setting temperature was changed to 280° C. The Y/X value, volume resistivity, relative density, thermal conductivity and anisotropy of the thermal conductivity of the resin composition were measured in accordance with the aforementioned methods. Table 2 shows the results.

Example 19

A resin composition in a pellet form was obtained in the same manner as in Example 15, except that the blending amount of the modified polyolefin-based polymer (b-1) was changed to 5% by volume, that the blending amount of the resin ($c_{aff}$-1) was changed to 12% by volume, that 80% by volume of the resin (c1-3) was used in place of the resin (c1-1), and that the cylinder setting temperature was changed to 280° C. The Y/X value, volume resistivity, relative density, thermal conductivity and anisotropy of the thermal conductivity of the resin composition were measured in accordance with the aforementioned methods. Table 2 shows the results.

Example 20

A resin composition in a pellet form was obtained in the same manner as in Example 15, except that the blending amount of the carbon-based nanofiller (a-2) was changed to 6% by volume, that 7% by volume of the modified polyolefin-based polymer (b-3) was used in place of the modified polyolefin-based polymer (b-1), that 59% by volume of the resin (c1-4) was used in place of the resin (c1-1), and that the cylinder setting temperature was changed to 250° C. The Y/X value, volume resistivity, relative density, thermal conductivity and anisotropy of the thermal conductivity of the resin composition were measured in accordance with the aforementioned methods. Table 2 shows the results.

Example 22

3.45% by volume of the carbon-based nanofiller (a-3), 24.14% by volume of the modified polyolefin-based polymer (b-1) and 72.41% by volume of the resin ($C_{aff}$-2) were blended. The blended components were fed into a twin-screw melt kneading extruder with a vent (manufactured by TECH-NOVEL CORPORATION, screw diameter: 15 mm, L/D: 60), and melt-kneaded under conditions of a cylinder setting temperature of 200° C. and a screw rotation rate of 100 rpm. The discharged kneaded material was extruded into a strand shape, and cut with a cutter after being cooled. Thus, pellets were formed. The pellets were vacuum-dried at 60° C. for 12 hours. Thereafter, relative to 100% by volume of the total of all components of a target resin composition, 29% by volume of the pellets (comprising 1% by volume of the carbon-based nanofiller (a-3), 7% by volume of the modified polyolefin-based polymer (b-1) and 21% by volume of the resin ($C_{aff}$-2)) and 71% by volume of the resin (c1-1) were fed into the twin-screw melt kneading extruder, and melt-kneaded under conditions of a resin temperature of 290° C. and a screw rotation rate of 100 rpm. The discharged kneaded material was extruded into a strand shape, and cut with a cutter after being cooled. Thus, a resin composition in a pellet form was obtained. The Y/X value, volume resistivity, relative density, thermal conductivity and anisotropy of the thermal conductivity of this resin composition were measured in accordance with the aforementioned methods. Table 2 shows the results.

Example 23

3.45% by volume of the carbon-based nanofiller (a-3), 24.14% by volume of the modified polyolefin-based polymer (b-1) and 72.41% by volume of the resin ($C_{aff}$-2) were blended. The blended components were fed into a twin-screw melt kneading extruder with a vent (manufactured by TECH-NOVEL CORPORATION, screw diameter: 15 mm, L/D: 60), and melt-kneaded under conditions of a cylinder setting temperature of 200° C. and a screw rotation rate of 100 rpm. The discharged kneaded material was extruded into a strand shape, and cut with a cutter after being cooled. Thus, pellets were formed. The pellets were vacuum-dried at 60° C. for 12 hours. Thereafter, relative to 100% by volume of the total of all components of a target resin composition, 24.65% by volume of the pellets (comprising 0.85% by volume of the carbon-based nanofiller (a-3), 5.95% by volume of the modified polyolefin-based polymer (b-1) and 17.85% by volume of the resin ($C_{aff}$-2)), 60.35% by volume of the resin (c1-1) and 15% by volume of the filler (d-2) were fed into the twin-screw melt kneading extruder, and melt-kneaded under conditions of a resin temperature of 290° C. and a screw rotation rate of 100 rpm. The discharged kneaded material was extruded into a strand shape, and cut with a cutter after being cooled. Thus, a resin composition in a pellet form was obtained. The Y/X value, volume resistivity, relative density, thermal conductivity and anisotropy of the thermal conductivity of the resin composition were measured in accordance with the aforementioned methods. Table 2 shows the results.

TABLE 2

| | Carbon-based nanofiller | | Modified polyolefin-based polymer | | High affinity resin | | Different resin | | Filler | | Dispersant | | Y (vol %) | Y/X | Volume resistivity (Ω·cm) | Thermal conductivity (W/mK) | Anisotropy of thermal conductivity | Relative density (g/cm³) |
|---|---|---|---|---|---|---|---|---|---|---|---|---|---|---|---|---|---|---|
| | type | vol % | type | vol % | type | vol % | type | vol % | type | vol % | type | vol % | | | | | | |
| Ex. 1 | a-1 | 1 | b-1 | 7 | $c_{aff}$1 | 21 | c1-1 | 71 | — | | — | | 52.5 | 2.5 | $8.5 \times 10^{15}$ | 0.43 | 0.91 | 1.25 |
| Ex. 2 | a-1 | 1 | b-1 | 14 | $c_{aff}$1 | 14 | c1-1 | 71 | — | | — | | 52.0 | 3.0 | $1.3 \times 10^{15}$ | 0.42 | 0.91 | 1.25 |
| Ex. 3 | a-1 | 1 | b-1 | 21 | $c_{aff}$1 | 7 | c1-1 | 71 | — | | — | | 28.0 | 4.0 | $1.1 \times 10^{14}$ | 0.41 | 0.90 | 1.25 |
| Ex. 4 | a-1 | 1 | b-1 | 7 | $c_{aff}$2 | 21 | c1-1 | 71 | — | | — | | 58.6 | 2.8 | $3.0 \times 10^{16}$ | 0.42 | 0.90 | 1.25 |
| Ex. 5 | a-1 | 1 | b-1 | 7 | $c_{aff}$3 | 21 | c1-1 | 71 | — | | — | | 55.0 | 2.6 | $1.5 \times 10^{16}$ | 0.42 | 0.90 | 1.25 |
| Ex. 6 | a-1 | 1 | b-1 | 7 | $c_{aff}$4 | 21 | c1-1 | 71 | — | | — | | 50.4 | 2.4 | $5.0 \times 10^{15}$ | 0.43 | 0.91 | 1.25 |
| Ex. 7 | a-1 | 3 | b-1 | 7 | $c_{aff}$1 | 28 | c1-1 | 62 | — | | — | | 60.9 | 2.9 | $5.0 \times 10^{13}$ | 0.66 | 0.89 | 1.24 |
| Ex. 8 | a-1 | 1 | b-1 | 7 | $c_{aff}$1 | 7 | c1-1 | 85 | — | | — | | 24.5 | 3.5 | $3.2 \times 10^{15}$ | 0.40 | 0.89 | 1.31 |
| Ex. 9 | a-1 | 1 | b-1 | 7 | $c_{aff}$1 | 62 | c1-1 | 30 | — | | — | | 49.6 | 1.6 | $1.4 \times 10^{13}$ | 0.42 | 0.87 | 1.07 |
| Ex. 10 | a-1 | 1 | b-1 | 7 | $c_{aff}$1 | 21 | c1-1 | 70.95 | — | | e-1 | 0.05 | 44.1 | 2.1 | $1.0 \times 10^{14}$ | 0.45 | 0.93 | 1.25 |
| Ex. 11 | a-1 | 1 | b-1 | 7 | $c_{aff}$5 | 21 | c1-1 | 71 | — | | — | | 46.0 | 2.3 | $4.4 \times 10^{13}$ | 0.41 | 0.89 | 1.32 |
| Ex. 12 | a-1 | 1 | b-2 | 7 | $c_{aff}$1 | 21 | c1-1 | 71 | — | | — | | 31.5 | 2.1 | $4.0 \times 10^{14}$ | 0.40 | 0.89 | 1.25 |
| Ex. 13 | a-1 | 1 | b-1 | 7 | $c_{aff}$1 | 21 | c1-1 | 41 | d-1 | 30 | — | | 33.6 | 2.4 | $3.5 \times 10^{16}$ | 0.85 | 0.91 | 1.94 |
| Ex. 14 | a-1 | 1 | b-1 | 7 | $c_{aff}$1 | 21 | c1-1 | 61 | d-2 | 10 | — | | 43.2 | 2.4 | $3.1 \times 10^{16}$ | 0.80 | 0.91 | 1.37 |
| Ex. 15 | a-2 | 3 | b-1 | 7 | $c_{aff}$1 | 28 | c1-1 | 62 | — | | — | | 72.5 | 2.9 | $2.0 \times 10^{15}$ | 0.58 | 0.89 | 1.24 |
| Ex. 16 | a-3 | 1.5 | b-1 | 3.5 | $c_{aff}$1 | 21 | c1-1 | 74 | — | | — | | 46.2 | 2.2 | $4.0 \times 10^{13}$ | 0.60 | 0.89 | 1.27 |
| Ex. 17 | a-3 | 3 | b-1 | 7 | $c_{aff}$1 | 28 | c1-1 | 62 | — | | — | | 75.0 | 3.0 | $2.5 \times 10^{13}$ | 0.80 | 0.89 | 1.24 |
| Ex. 18 | a-2 | 3 | b-1 | 7 | $c_{aff}$1 | 28 | c1-2 | 62 | — | | — | | 60.0 | 2.5 | $4.4 \times 10^{15}$ | 0.56 | 0.89 | 1.15 |
| Ex. 19 | a-2 | 3 | b-1 | 5 | $c_{aff}$1 | 12 | c1-3 | 80 | — | | — | | 27.6 | 2.3 | $7.4 \times 10^{15}$ | 0.38 | 0.87 | 1.19 |
| Ex. 20 | a-2 | 6 | b-3 | 7 | $c_{aff}$1 | 28 | c1-4 | 59 | — | | — | | 42.0 | 2.0 | $1.2 \times 10^{14}$ | 0.52 | 0.87 | 1.19 |
| Ex. 21 | a-3 | 1 | b-1 | 7 | $c_{aff}$2 | 21 | c1-1 | 71 | — | | — | | 54.6 | 2.6 | $1.7 \times 10^{14}$ | 0.45 | 0.89 | 1.25 |
| Ex. 22 | a-3 | 1 | b-1 | 7 | $c_{aff}$2 | 21 | c1-1 | 71 | — | | — | | 85.0 | 4.0 | $1.8 \times 10^{16}$ | 0.46 | 0.90 | 1.25 |
| Ex. 23 | a-3 | 0.85 | b-1 | 5.95 | $c_{aff}$2 | 17.85 | c1-1 | 60.35 | d-2 | 15 | — | | 70.0 | 3.9 | $3.8 \times 10^{16}$ | 1.01 | 0.91 | 1.39 |

Comparative Examples 1 to 7, 9, 11, and 12

Figure 5:
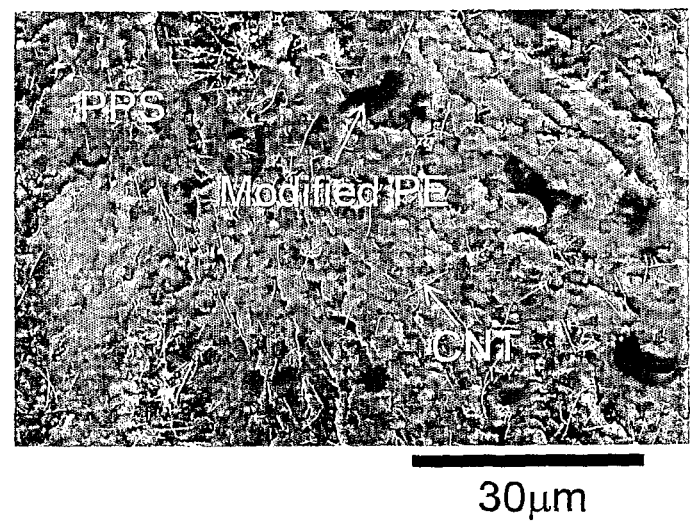
FIG. 5 is a scanning electron micrograph of a freeze-fracture surface at a very central part of a molded product of a resin composition obtained in Comparative Example 2.
Figure 6A:
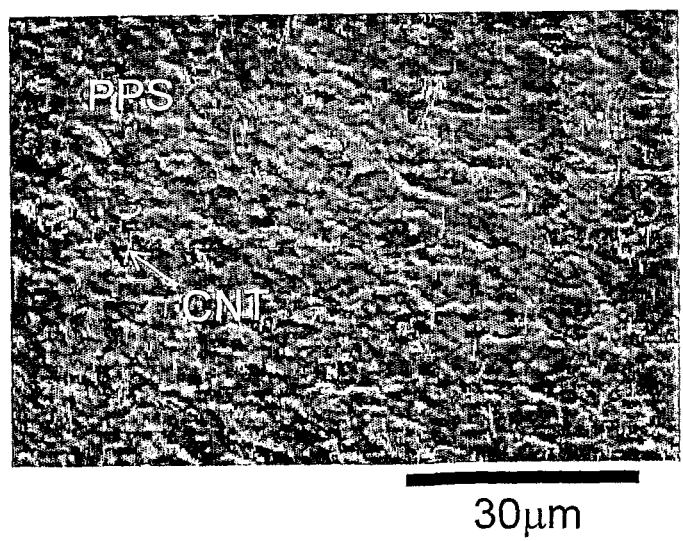
FIG. 6A is a scanning electron micrograph of a freeze-fracture surface at a very central part of a molded product of a resin composition obtained in Comparative Example 12.
Figure 6B:
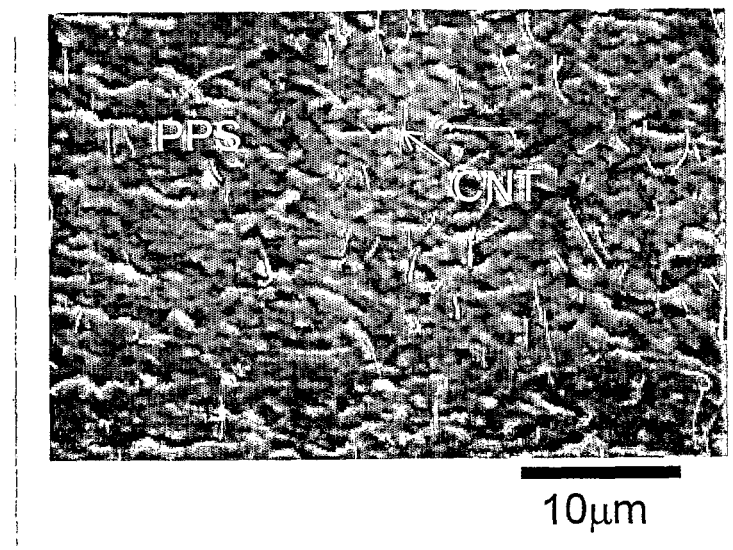
FIG. 6B is a scanning electron micrograph of the freeze-fracture surface at the very central part of the molded product of the resin composition obtained in Comparative Example 12.

Each resin composition in a pellet form was obtained in the same manner as in Example 1, except that a carbon-based nanofiller, a modified polyolefin-based polymer, a high affinity resin, a different resin, a filler and a dispersant were used in a corresponding combination and corresponding blending amounts shown in Table 3. Further, the cylinder setting temperature was changed to 200° C. in Comparative Example 9. The Y/X value, volume resistivity, relative density, thermal conductivity and anisotropy of the thermal conductivity of each of the resin compositions were measured in accordance with the aforementioned methods. Table 3 shows the results. In addition, FIG. 5 shows a SEM photograph of freeze-fracture surface at the very central part of a molded product, the SEM photograph being taken of Comparative Example 2. FIG. 6A shows a SEM photograph of a freeze-fracture surface at the very central part of a molded product, the SEM photograph being taken of Comparative Example 12, and FIG. 6B shows an enlarged photograph thereof. Note that CNT represents carbon nanotube, PE represents polyethylene, and PPS represents polyphenylene sulfide.

Comparative Example 8

The volume resistivity, relative density, thermal conductivity and anisotropy of the thermal conductivity of the resin ($c_{aff}$-1) were measured in accordance with the aforementioned methods. Table 3 shows the results.

Comparative Example 10

The volume resistivity, relative density, thermal conductivity and anisotropy of the thermal conductivity of the resin (c1-1) were measured in accordance with the aforementioned methods. Table 3 shows the results.

Comparative Example 13

A resin composition in a pellet form was obtained in the same manner as in Comparative Example 6, except that 97% by volume of the resin (c1-2) was used in place of the resin (c1-1), and that the cylinder setting temperature was changed to 280° C. The volume resistivity, relative density, thermal conductivity and anisotropy of the thermal conductivity of this resin composition were measured in accordance with the aforementioned methods. Table 3 shows the results.

Comparative Example 14

A resin composition in a pellet form was obtained in the same manner as in Comparative Example 7, except that 97% by volume of the resin (c1-3) was used in place of the resin (c1-1), and that the cylinder setting temperature was changed to 280° C. The volume resistivity, relative density, thermal conductivity and anisotropy of the thermal conductivity of this resin composition were measured in accordance with the aforementioned methods. Table 3 shows the results.

Comparative Example 15

A resin composition in a pellet form was obtained in the same manner as in Comparative Example 14, except that 12% by volume of the resin ($c_{aff}$-1) and 85% by volume of the resin (c1-3) were used in place of 97% by volume of the resin (c1-2). The Y/X value, volume resistivity, relative density, thermal conductivity and anisotropy of the thermal conductivity of this resin composition were measured in accordance with the aforementioned methods. Table 3 shows the results.

Comparative Example 16

A resin composition in a pellet form was obtained in the same manner as in Comparative Example 15, except that the blending amount of the carbon-based nanofiller (a-2) was changed to 6% by volume, that the blending amount of the resin ($c_{aff}$-1) was changed to 28% by volume, that 66% by volume of the resin (c1-4) was used in place of the resin (c1-3), and that the cylinder setting temperature was changed to 250° C. The Y/X value, volume resistivity, relative density, thermal conductivity and anisotropy of the thermal conductivity of this resin composition were measured in accordance with the aforementioned methods. Table 3 shows the results.

TABLE 3

| | Carbon-based nanofiller | | Modified polyolefin-based polymer | | High affinity resin | | Different resin | | Filler | | Dispersant | | Y (vol %) | Y/X | Volume resistivity (Ω·cm) | Thermal conductivity (W/mK) | Anisotropy of thermal conductivity | Relative density (g/cm³) |
|---|---|---|---|---|---|---|---|---|---|---|---|---|---|---|---|---|---|---|
| | type | vol % | type | vol % | type | vol % | type | vol % | type | vol % | type | vol % | | | | | | |
| Comp. Ex. 1 | a-1 | 1 | — | | — | | $c_{aff}$-1 | 21 | c1-1 | 78 | — | | 18.2 | 1.3 | $3.5 \times 10^9$ | 0.40 | 0.83 | 1.28 |
| Comp. Ex. 2 | a-1 | 1 | b-1 | 7 | — | | — | | c1-1 | 92 | — | | — | — | $6.3 \times 10^{11}$ | 0.36 | 0.81 | 1.34 |
| Comp. Ex. 3 | — | | b-1 | 14 | $c_{aff}$-1 | 14 | — | | c1-1 | 72 | — | | — | — | $4.5 \times 10^{15}$ | 0.26 | 0.97 | 1.25 |
| Comp. Ex. 4 | a-1 | 1 | — | | — | | — | | c1-1 | 54 | d-1 | 45 | — | — | $5.0 \times 10^{15}$ | 0.84 | 0.79 | 2.38 |
| Comp. Ex. 5 | a-1 | 1 | — | | — | | — | | c1-1 | 84 | d-2 | 15 | — | — | $3.5 \times 10^{15}$ | 0.76 | 0.79 | 1.50 |
| Comp. Ex. 6 | a-1 | 3 | — | | — | | — | | c1-1 | 97 | — | | — | — | $<1.0 \times 10^3$ | 0.55 | 0.73 | 1.38 |
| Comp. Ex. 7 | a-2 | 3 | — | | — | | — | | c1-1 | 97 | — | | — | — | $<1.0 \times 10^3$ | 0.44 | 0.76 | 1.38 |
| Comp. Ex. 8 | — | | — | | $c_{aff}$-1 | 100 | — | | — | | — | | — | — | $2.4 \times 10^{16}$ | 0.40 | 0.97 | 0.96 |
| Comp. Ex. 9 | a-1 | 1 | — | | $c_{aff}$-1 | 99 | — | | — | | — | | — | — | $2.1 \times 10^{10}$ | 0.41 | 0.78 | 0.97 |
| Comp. Ex. 10 | — | | — | | — | | — | | c1-1 | 100 | — | | — | — | $1.8 \times 10^{16}$ | 0.24 | 0.97 | 1.36 |
| Comp. Ex. 11 | a-1 | 1 | — | | — | | — | | c1-1 | 99 | — | | — | — | $1.0 \times 10^9$ | 0.32 | 0.77 | 1.37 |
| Comp. Ex. 12 | a-1 | 1 | — | | — | | — | | c1-1 | 98.95 | — | | e-1 | 0.05 | — | — | $5.0 \times 10^7$ | 0.36 | 0.88 | 1.37 |
| Comp. Ex. 13 | a-1 | 3 | — | | — | | — | | c1-2 | 97 | — | | — | — | $<1.0 \times 10^3$ | 0.49 | 0.72 | 1.25 |
| Comp. Ex. 14 | a-2 | 3 | — | | — | | — | | c1-3 | 97 | — | | — | — | $2.3 \times 10^{11}$ | 0.28 | 0.75 | 1.23 |

TABLE 3-continued

| | Carbon-based nanofiller | | Modified polyolefin-based polymer | | High affinity resin | | Different resin | | Filler | | Dispersant | | Y (vol %) | Y/X | Volume resistivity (Ω·cm) | Thermal conductivity (W/mK) | Anisotropy of thermal conductivity | Relative density (g/cm³) |
|---|---|---|---|---|---|---|---|---|---|---|---|---|---|---|---|---|---|---|
| | type | vol % | type | vol % | type | vol % | type | vol % | type | vol % | type | vol % | | | | | | |
| Comp. Ex. 15 | a-2 | 3 | — | | $c_{aff}$-1 | 12 | c1-3 | 85 | — | | — | | 7.8 | 1.3 | $1.4 \times 10^9$ | 0.32 | 0.80 | 1.21 |
| Comp. Ex. 16 | a-2 | 6 | — | | $c_{aff}$-1 | 28 | c1-4 | 66 | — | | — | | 5.2 | 1.3 | $<1.0 \times 10^3$ | 0.45 | 0.77 | 1.19 |

As apparent from the results shown in FIGS. 2A and 2B, it was found out that, in the resin composition (Example 1) of the present invention, the carbon-based nanofiller (A) was encapsulated in the dispersed phase formed from the polyethylene which is the high affinity resin ($C_{aff}$), and the epoxy-modified polyethylene which is modified polyolefin-based polymer (B) (including reaction products of the epoxy-modified polyethylene) was present at an interface between the dispersed phase and the continuous phase formed from the polyphenylene sulfide which is the different resin (C1).

Note that, since being different in glass transition temperature, a polyethylene and a modified polyethylene can be distinguished from each other in a SEM photograph as follows. Specifically, because of the lower glass transition temperature (approximately −120° C.) of a polyethylene than that of a modified polyethylene, when the temperature at the time of freeze fracture is between the glass transition temperature of the polyethylene and the glass transition temperature of the modified polyethylene, the polyethylene tends to be cut while being stretched, at the time of freeze fracture. As a result, there remains a trace showing that the polyethylene is cut while being stretched at the freeze-fracture surface. In contrast, a modified polyethylene which has a higher glass transition temperature than a polyethylene (for example, approximately −26° C., provided that the temperature varies depending on the degree of modification and the type thereof) is not cut in a state where the modified polyethylene is stretched at the time of freeze fracture. Accordingly, a part where a cut-surface stretched at the time of freeze fracture is observed, a part encompassed by the part, and the like correspond to polyethylene. Therefore, a polyethylene and a modified polyethylene can be distinguished from each other by difference in the trace at the freeze-fracture surface.

Further, as apparent from the results shown in FIGS. 3A and 3B, it was found out that, in the resin composition (Example 1) of the present invention, the carbon-based nanofiller (A) was present in the dispersed phase of the polyethylene. In addition, an interface layer formed from a graft polymer which had been formed through a reaction of at least part of the epoxy-modified polyethylene with the polyphenylene sulfide was observed between the polyphenylene sulfide and the polyethylene.

In contrast, as apparent from the result shown in FIG. 5, it was found out that, in the resin composition (Comparative Example 2) comprising no high affinity resin ($C_{aff}$), the modified polyethylene formed a dispersed phase and the polyphenylene sulfide formed a continuous phase. In this case, it was found out that the carbon-based nanofiller (A) was not encapsulated in the dispersed phase, but was dispersed in the continuous phase, because the modified polyethylene had a low affinity for the carbon-based nanofiller (A).

Further, as apparent from the results shown in FIGS. 6A and 6B, it was found out that, in the resin composition (Comparative Example 12) which comprised no modified polyolefin-based polymer (B) and no high affinity resin ($C_{aff}$), but comprised the imide ring-containing vinyl-based polymer, no dispersed phase was formed and the carbon-based nanofiller (A) was uniformly dispersed in the polyphenylene sulfide.

As apparent from the results shown in Tables 2 and 3, the resin compositions (Examples 1 to 23) of the present invention had higher levels of both thermal conductive properties and insulating properties as well as a relative density in which an increase is restrained, and further were less likely to exhibit anisotropy of thermal conductivity even when subjected to the injection molding than the resin compositions (Comparative Examples 1 to 16) which did not comprise at least one component of the carbon-based nanofiller (A), the modified polyolefin-based polymer (B), the high affinity resin ($C_{aff}$) and the different resin (C1) according to the present invention.

For example, in the resin compositions (Examples 1, 19 and 20) comprising the modified polyolefin-based polymer (B) and the high affinity resin ($C_{aff}$), the modified polyolefin-based polymer (B) was present at the interface between the dispersed phase formed from the high affinity resin ($C_{aff}$) and the continuous phase formed from the different resin (C1). As a result, the resin compositions (Examples 1, 19 and 20) had a reduced thermal resistance at the interface and thereby had a higher thermal conductivity than the resin compositions (Comparative Examples 1, 15 and 16) comprising the high affinity resin ($C_{aff}$) but comprising no modified polyolefin-based polymer (B). Further, in the resin compositions of Examples 1, 19 and 20, the Y/X values were large, because a large amount of the carbon-based nanofiller (A) was encapsulated in the dispersed phase formed from the high affinity resin ($C_{aff}$). Thereby, no electrically conductive path was formed between adjacent pieces of the dispersed phase or between the dispersed phase and the continuous phase, and thus the volume resistivities were high.

In contrast, in the resin compositions (Comparative Examples 1, 15 and 16) comprising no modified polyolefin-based polymer (B), the Y/X values were small, because an amount of the carbon-based nanofiller ($A_{dsp}$) completely encapsulated in the dispersed phase was small, and a large amount of the carbon-based nanofiller (A) were present in the continuous phase. Further, contact between pieces of the carbon-based nanofiller (A) protruding from the dispersed phase and contact between the carbon-based nanofiller (A) protruding from the dispersed phase and the carbon-based nanofiller (A) in the continuous phase results in the formation of electrically conductive paths between adjacent pieces of dispersed phase and between the dispersed phase and the continuous phase, and thus volume resistivities were lowered.

Further, the carbon-based nanofiller (a-2) used in Examples 19 and 20, as well as Comparative Examples 15 and 16 has a larger average diameter and a smaller aspect ratio than the carbon-based nanofiller (a-1), although having a higher G/D value. For this reason, the carbon-based nanofiller (a-2) has poor thermal conductive properties. Accordingly, it is necessary to add a lager amount of the carbon-based nanofiller (a-2) than the carbon-based nanofiller (a-1). Even when such a carbon-based nanofiller (a-2) was used, the resin composition (Example 19) comprising the modified polyolefin-based polymer (B) had a relatively high thermal conductivity and a relatively high volume resistivity. Further, even when the content of the carbon-based nanofiller (a-2) was increased in order to increase the thermal conductivity (Example 20), no remarkable decrease in volume resistivity was observed.

In contrast, in a case (Comparative Example 15) where such a carbon-based nanofiller (a-2) was used for the resin composition comprising no modified polyolefin-based polymer (B), the thermal conductivity and the volume resistivity were small. Further, in a case (Comparative Example 16) where the content of the carbon-based nanofiller (a-2) was increased in order to increase the thermal conductivity, the volume resistivity was remarkably lowered.

Comparison of Example 1 with Comparative Example 2 shows that, in the resin composition (Comparative Example 2) comprising the modified polyolefin-based polymer (B) but comprising no high affinity resin ($C_{aff}$), the phase structure according to the present invention was not formed, and the thermal conductivity and the volume resistivity were lowered.

Comparison of Example 1 with Comparative Examples 9 and 11 shows that, in the resin compositions (Comparative Examples 9 and 11) comprising no modified polyolefin-based polymer (B) and comprising only one of the high affinity resin ($C_{aff}$) and the different resin (C1), pieces of the carbon-based nanofiller (A) were in contact with each other in the resin, thereby forming an electrically conductive path, and thus the volume resistivity was lowered.

Further, in a case (Example 9) where the content of the high affinity resin ($C_{aff}$) is higher than that of the different resin (C1), the modified polyolefin-based polymer (B) was used, and the high affinity resin ($C_{aff}$-1) with a relatively high melt viscosity was used as the high affinity resin ($C_{aff}$). Hence, a dispersed phase encapsulating the carbon-based nanofiller (A) was formed, and high values of the thermal conductivity and the volume resistivity were retained.

Comparison of Example 1 with Example 10 shows that, in the resin composition comprising the imide ring-containing vinyl-based polymer (e-1), the thermal conductivity was increased with a high volume resistivity being retained, and the anisotropy of the thermal conductivity in the processing under shear was lowered.

Further, in the resin compositions of Examples 13 and 14, the addition of a relatively small amount of thermally conductive filler increased the thermal conductivity and the volume resistivity with the increase in relative density being restrained as much as possible, in comparison with the resin composition of Example 1 comprising no thermally conductive filler. In contrast, the resin composition of Comparative Examples 4 and 5 required an increased amount of thermally conductive filler with a high relative density and a high cost in order to increase the thermal conductivity and the volume resistivity, in comparison with the resin composition of Comparative Example 11 comprising no thermally conductive filler. As a result, the resin compositions of Comparative Examples 4 and 5 had larger relative densities than the resin composition of Comparative Example 11.

The resin compositions of Examples 16 and 17 comprised the carbon-based nanofiller (a-3) having a G/D value of 10.0, an aspect ratio of 100 or more, and an average diameter of 80 nm. Accordingly, without adding the thermally conductive filler, the thermal conductivity of each of the resin compositions of Example 16 to 17 reached 0.6 W/mK or more.

In addition, it was found out that, in each case (Example 15 and 18) where a crystalline resin was used as the different resin (C1), the thermal conductivity was higher than those in cases (Examples 19 and 20) where non-crystalline resins were used.

Further, as a result of comparison among the resin compositions of Examples 21 to 23, the followings were found out. Specifically, for the resin compositions of Examples 22 and 23, the carbon-based nanofiller (a-3), the modified polyolefin-based polymer (b-1) and the resin ($c_{aff}$-2) were first mixed by melt kneading, and then the resin (c1-1) was mixed thereto. Accordingly, the carbon-based nanofiller (a-3) was further highly localized in the resin ($c_{aff}$-2), and ability to provide thermal conductive properties was high. At the same time, even when the carbon-based nanofiller (a-3) which is more likely to lower the volume resistance was used, the resin composition of Examples 22 and 23 had higher volume resistances than the composition of Example 21 obtained by mixing all the components at once by melt kneading.

INDUSTRIAL APPLICABILITY

As has been described above, according to the present invention, it is possible to obtain a resin composition which has high levels of both thermal conductive properties and insulating properties as well as a relative density in which a increase is restrained, and which is less likely to exhibit anisotropy of thermal conductivity even when subjected to processing under shear.

Therefore, the resin composition of the present invention is useful in applications where thermal conductivities, heat dissipation property, isotropy of thermal conductivity, insulating properties, and the like are required. For example, the resin composition of the present invention is useful as applications such as various parts for automobiles, various parts for electrical and electronic equipments, highly thermally conductive sheets, heat sink plates, and electromagnetic wave absorbers.

REFERENCE SIGNS LIST

1: Carbon-based nanofiller (A), 2: Modified polyolefin-based polymer (B), 3: Dispersed phase [mainly of resin ($C_{aff}$)], 4: Continuous phase [mainly of resins (C1)]

The invention claimed is:
1. A resin composition comprising a carbon-based nanofiller (A), a modified polyolefin-based polymer (B), and two or more resins (C) other than the modified polyolefin-based polymer (B), the resin composition further comprising:
   a dispersed phase formed from a resin ($C_{aff}$) which has a highest affinity for the carbon-based nanofiller (A) among the two or more resins (C), and
   a continuous phase formed from the remaining one or more resins (C1), wherein
   at least part of the modified polyolefin-based polymer (B) is present at an interface between the dispersed phase and the continuous phase,
   the carbon-based nanofiller (A) is present in the dispersed phase, and
   the resin (C1) comprises a crystalline resin.
2. The resin composition according to claim 1, wherein Y/X is 1.5 or more, where X (unit: % by volume) represents a ratio of the dispersed phase to all the resin composition, and

Y (unit: % by volume) represents a ratio of a carbon-based nanofiller ($A_{dsp}$) contained in the dispersed phase to all the carbon-based nanofiller (A).

3. The resin composition according to claim 1, wherein at least part of the modified polyolefin-based polymer (B) is reacted with any one or both of the resin ($C_{aff}$) and the resin (C1).

4. The resin composition according to claim 1, wherein
a thermal conductivity of the resin composition is 0.3 W/mK or more, and
a volume resistivity of the resin composition is $10^{13}$ Ω·cm or more.

* * * * *